United States Patent [19]

Saito et al.

[11] Patent Number: 4,864,419
[45] Date of Patent: Sep. 5, 1989

[54] IMAGE PROCESSING APPARATUS

[75] Inventors: Tetsuo Saito, Kawasaki; Akihiko Takeuchi, Yokohama; Iichiro Yamamoto, Shiki; Motoi Kato, Yokohama; Yukihiro Ohzeki, Yokohama; Takahiro Inoue, Yokohama; Hiroshi Sasame, Yokohama; Hisashi Fukushima, Yokohama, all of Japan

[73] Assignee: Canon Kabushiki Kaisha, Tokyo, Japan

[21] Appl. No.: 81,442

[22] Filed: Aug. 4, 1987

[30] Foreign Application Priority Data

Dec. 9, 1986 [JP] Japan ................... 61-291587

[51] Int. Cl.$^4$ ................ G01D 15/14; H04N 1/40; H04N 1/29
[52] U.S. Cl. .................... 358/300; 346/153.1; 346/160; 358/296; 358/302; 358/298; 358/456
[58] Field of Search ............... 358/300, 280, 296, 283, 358/298, 302; 346/160, 153.1

[56] References Cited

U.S. PATENT DOCUMENTS 3,965,290  6/1976  Tisue ................. 358/280
4,040,094  8/1977  Everett et al. ........ 358/283
4,278,347  7/1981  Okamoto et al. .
4,680,646  7/1987  Ikeda ................. 358/300
4,697,910  10/1987  Kasuya ............... 358/300
4,709,250  11/1987  Takeuchi ............. 358/300

FOREIGN PATENT DOCUMENTS 144188  6/1985  European Pat. Off. .
230361  7/1987  European Pat. Off. .
3409406  9/1984  Fed. Rep. of Germany .

Primary Examiner—Clifford C. Shaw
Assistant Examiner—Scott A. Rogers
Attorney, Agent, or Firm—Fitzpatrick, Cella, Harper & Scinto

[57] ABSTRACT

There is disclosed an apparatus for obtaining image signal by tonal processing of an input signal. Pulse-width modulation of the input signal is achieved through comparison with a second signal of a predetermined shaped, for example a triangular signal. In order to avoid the influence of fluctuating factors in pulse-width modulation, the apparatus also has a third signal generator, and the pulse-width modulated signal or a pattern signal generated by the third signal generator is selectively used for image formation.

39 Claims, 20 Drawing Sheets

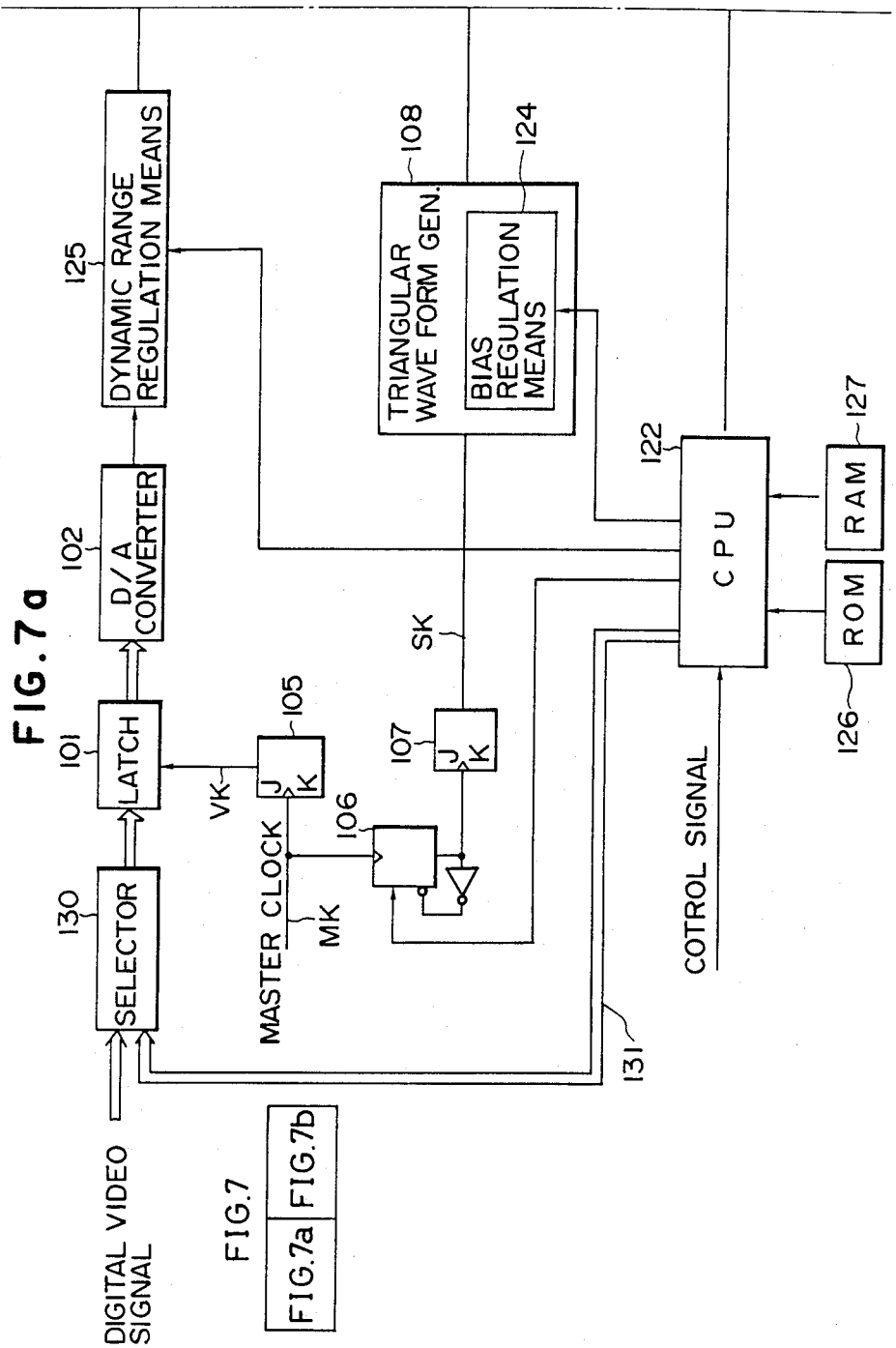

FIG. 9
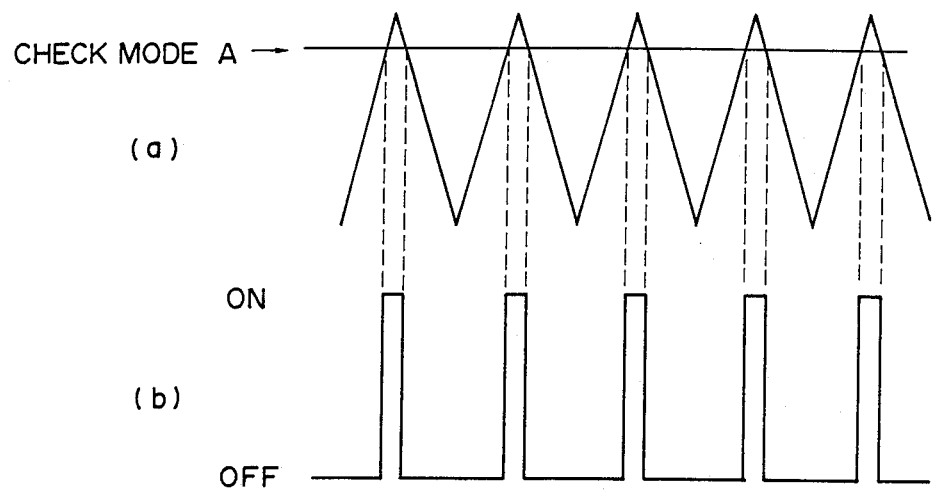
(a) CHECK MODE A
(b) ON / OFF
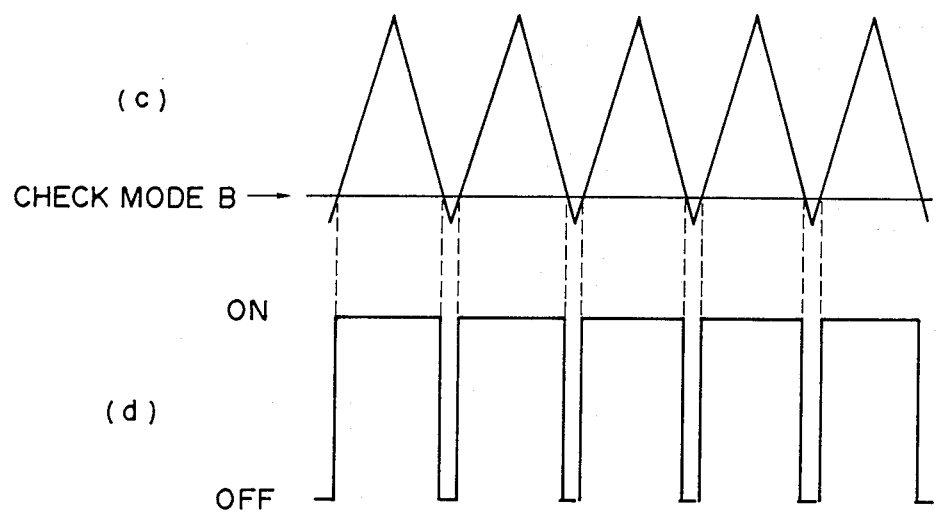
(c)
CHECK MODE B
(d) ON / OFF

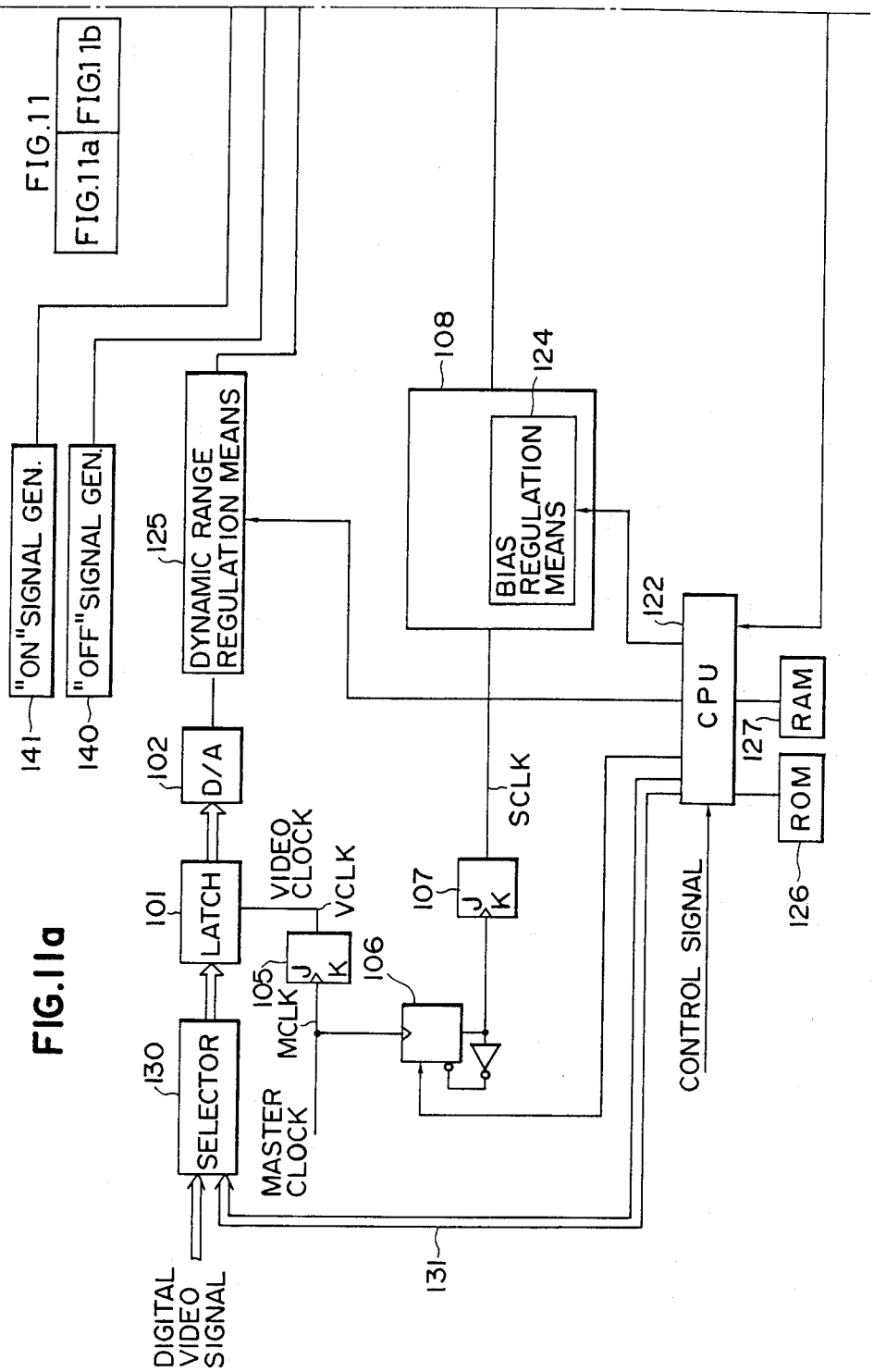

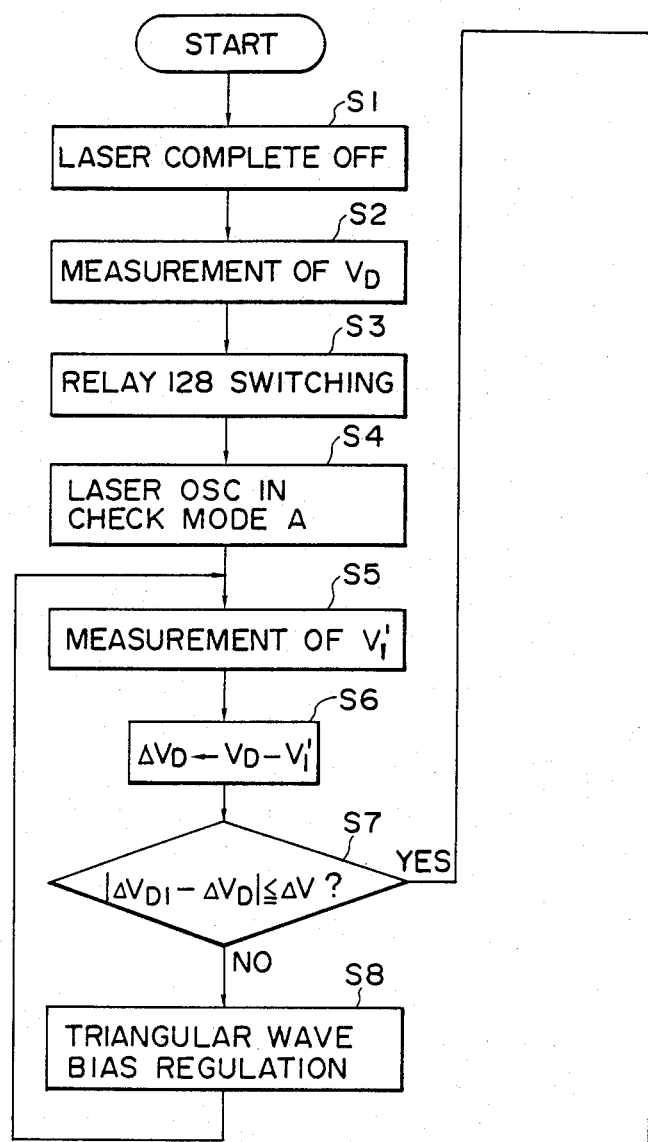

IMAGE PROCESSING APPARATUS

BACKGROUND OF THE INVENTION

1. Field of the Invention

The present invention relates to an image processing apparatus for obtaining image signal by tonal processing of an input image signal.

2. Related Background Art

For the purpose of obtaining tonal rendition in image formation for example with a laser beam printer by binary encoding of a digital image signal, the present applicant already proposed, in the U.S. patent application Ser. No. 765,938, a process of converting said digital image signal into an analog signal and comparing thus converted signal with a pattern signal such as a triangular signal, thereby obtaining a pulse-width modulated binary signal.

In such process, the level of the analog video signal and that of the triangular wave may assume a relationship as represented by (a), (b) or (c) in FIG. 18, for example according to the nature of image desired.

For example in a situation represented by (a) in FIG. 18, the tonal rendition in the low image density area is significantly affected if there exists even a small change in the relationship between the white level $\alpha$ of the analog video signal and the maximum value of the triangular wave, for example due to the thermal characteristic of the triangular wave generator. Also the tonal rendition in the high image density area is significantly affected if there exists even a small change in the relationship between the black level $\beta$ of the analog video signal and the minimum value of the triangular wave. Also even if there is no change in the relationship between the white and black levels of the analog video signal and the triangular wave, the regulation of said relationship is extremely difficult even with a synchroscope because even a minute aberration significantly affects the resulting image. Furthermore, even if the relationship between the white and black levels of the analog video signal and the triangular signal is maintained constant, the tonal rendition is significantly affected particularly in the high and low image density areas of the image because, in case of a laser beam printer, of fluctuations or variations in the laser power, response characteristic of laser, E-V characteristic of the photosensitive member etc.

SUMMARY OF THE INVENTION

In consideration of the foregoing, an object of the present invention is to provide an improved image processing apparatus.

Another object of the present invention is to provide an image processing apparatus capable of always providing a satisfactory output image.

Still another object of the present invention is to provide an image processing apparatus enabling appropriate correction of process conditions.

Still another object of the present invention is to provide an image processing apparatus allowing proper adjustment of an image processing circuit.

The foregoing and still other objects of the present invention, and the advantages thereof, will become fully apparent from the following description to be taken in conjunction with the attached drawings.

BRIEF DESCRIPTION OF THE DRAWINGS

FIGS. 9(a)–(d) are charts showing examples of pulse-width modulation in a check mode;

DETAILED DESCRIPTION OF THE PREFERRED EMBODIMENTS

Now the present invention will be clarified in detail by embodiments thereof shown in the attached drawings. In the following there will be explained an embodiment in which the present invention is applied to a laser beam printer.

Figure 4:
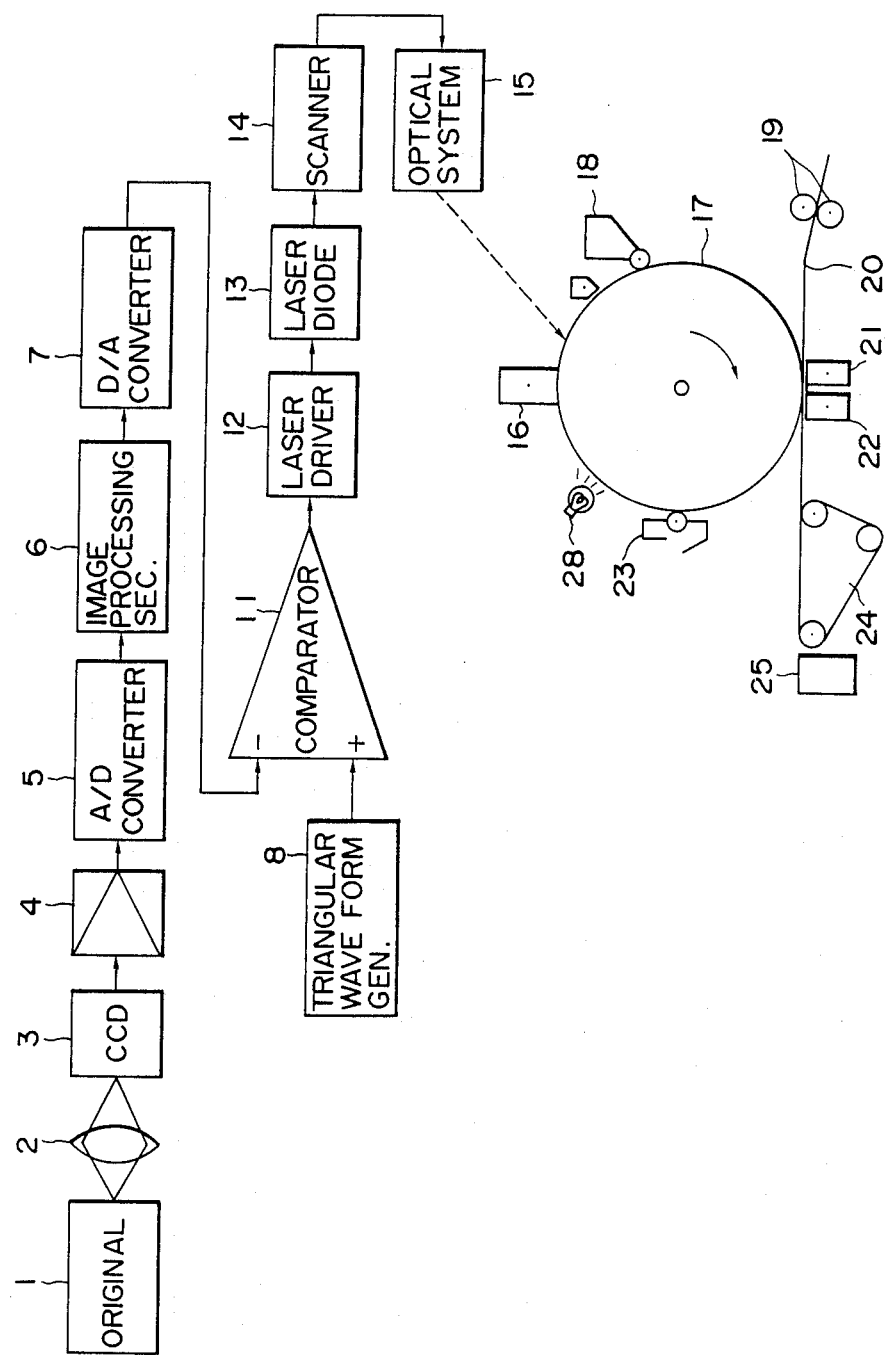
FIG. 4 is a block diagram of an example of an image processing apparatus previously proposed by the present applicant.

FIG. 4 is a block diagram of an example of the image processing apparatus previously proposed by the present applicant.

In FIG. 4 there are shown an original 1 providing an input image; a lens 2; a CCD 3 performing as an image sensor; an amplifier 4 for the image signal from the CCD3; an A/D converter 5; an image processing circuit 6 for γ-conversion for example on a 6-bit digital signal to obtain a converted digital signal; a D/A converter for converting said digital signal into an analog signal; a triangular wave generator 8 for generating a triangular wave synchronized with a beam detection signal; a comparator 11 for comparing the triangular wave generated by said triangular wave generator 8 with an image level signal supplied from the D/A converter 7; a laser driver 12 for driving a laser diode 13 according to the width of the pulses released by the comparator 11; a laser diode 13; a scanner 14 composed of a polygon mirror etc. for causing the scanning motion of the laser beam; an optical system 15 composed of a toric lens, an f-$\theta$ lens, mirrors etc.; a primary charger 16; a photosensitive drum 17; a developing unit 18; registration rollers 19; a recording sheet 20; a transfer charger 21; a separating charger 22; a cleaner 23; a conveyor unit 24 for the recording sheet 24; a fixing unit 25; and a light-emitting element 28 for pre-exposure.

The image of the original 1 is projected onto the CCD 3 through the lens 2. An analog image signal, released from the CCD 3, is amplified by the amplifier 4 and converted, by the A/D converter 5, into a digital signal for example of 6 bits. Said digital signal is subjected to a $\gamma$-conversion, in the image processing circuit 6, into a digital image signal, which is again converted, in the D/A converter 7, into an analog image level signal. On the other hand, the triangular wave oscillator 8 generates a triangular wave synchronized with the already known beam detection (BD) signal.

Figure 5:
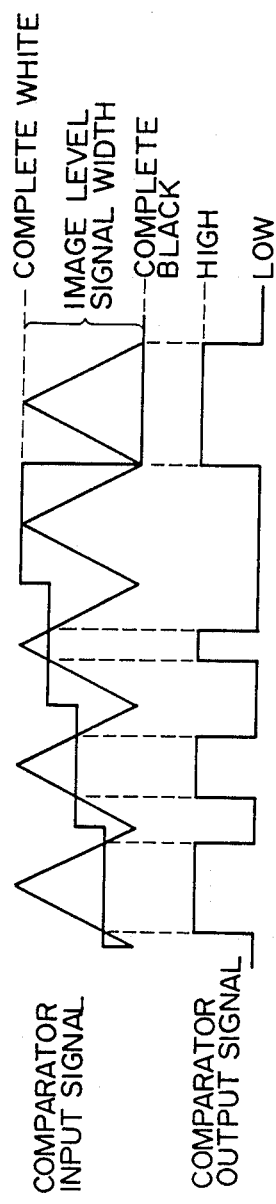
FIGS. 5 and 6 are charts showing pulse-width modulation previously proposed by the present applicant.

The comparator 11 compares said analog image level signal with the triangular wave signal. FIG. 5 shows an example of image level signal varying stepwise from black level to white level, and the comparator releases a high-level output signal only when the triangular wave signal exceeds the image level signal. Thus the pulse duration of the output signal of the comparator 11 becomes smaller as the image level changes from low (black) to high (white).

Thus the pulse duration of the output signal of the comparator 11 becomes zero for the complete white level, and becomes equal to the period of the triangular wave for the complete black level. The laser driver 12 is activated according to said pulse duration thereby causing light emission from the laser diode 13. The laser beam from the laser diode 13 performs a scanning motion by the scanner 14 and the optical system 15, whereby the beam spot scans the photosensitive drum 17 previously charged by the primary charger 16. In this manner an electrostatic latent image is formed. Subsequently, in the developing unit 18, toner is deposited in the areas exposed to the laser beam, thereby forming a visible image on the photosensitive drum 17.

On the other hand, the recording sheet 20 is supplied, through the registration rollers 19, to the transfer charger 21. The toner deposited on the photosensitive drum 17 is transferred onto the sheet 20, which is then separated from the drum 17 by the function of the separating charger 22. Subsequently the sheet 20 is transported by the conveyor unit 24, and is subjected to image fixation in the fixing unit 25. On the other hand the toner remaining on the photosensitive drum 17 is removed by a cleaner 23, and the charge remaining on said drum is eliminated by the light-emitting element 28 for pre-exposure. In this manner a cycle of electrophotographic process is completed.

In such electrophotographic process, the surface potential of the photosensitive drum 17 is dissipated and becomes lower as the exposure time with the laser diode 13 becomes longer. In reversal development, the image density becomes higher as the surface potential becomes lower.

Consequently the image density becomes proportional to the pulse duration of the output signal of the comparator 11, and there can thus be obtained an output image with tonal rendition.

Figure 6:
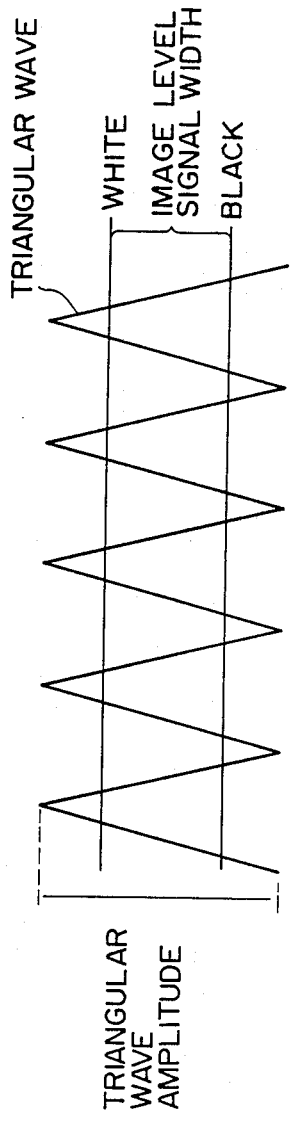

The above-explained function is however insufficient from the standpoint of an image forming apparatus utilizing electrophotography, because, in processing a photographic original, there are observed defects that low density areas may appear as totally white areas, or high density areas may appear as totally black areas. For this reason, the amplitude of the triangular wave generated by the triangular wave generator 8 is selected somewhat larger, as shown in FIG. 6. Such selection provides sufficient tonal rendition in processing a photographic original, since small pulses are generated even in the white image areas and totally black level is avoided in the high density areas.

However, in case of surface potential regulation or potential control utilizing the high voltage applied to the drum 17 and the intensity of the laser diode 13 as controlling parameters, based on the totally black (dark) level $V_D$ and the totally white (light) level $V_L$ automatically or manually detected with a potential sensor, there will still be required following functions.

In case of regulating the surface potential or performing the potential control with a high voltage, it is necessary, in order to obtain the required potential $V_D$, to completely turn off the laser diode 13, thereby avoiding the dissipation of the surface potential with the image exposure. It is therefore indispensable to provide a function of generating a signal of zero pulse duration corresponding to complete white.

Also in case of regulating the surface potential or performing the potential control with the intensity of the laser diode 13, it is necessary, in order to obtain the required potential $V_L$, to completely turn on the laser diode 13. It is therefore indispensable to have a function of generating a signal of infinite pulse width, corresponding to complete black.

The above-mentioned functions are required also in case of regulating the developing bias $V_{DC}$ automatically or manually, utilizing the values of $V_D$ and $V_L$ detected with a potential sensor.

Figure 1:
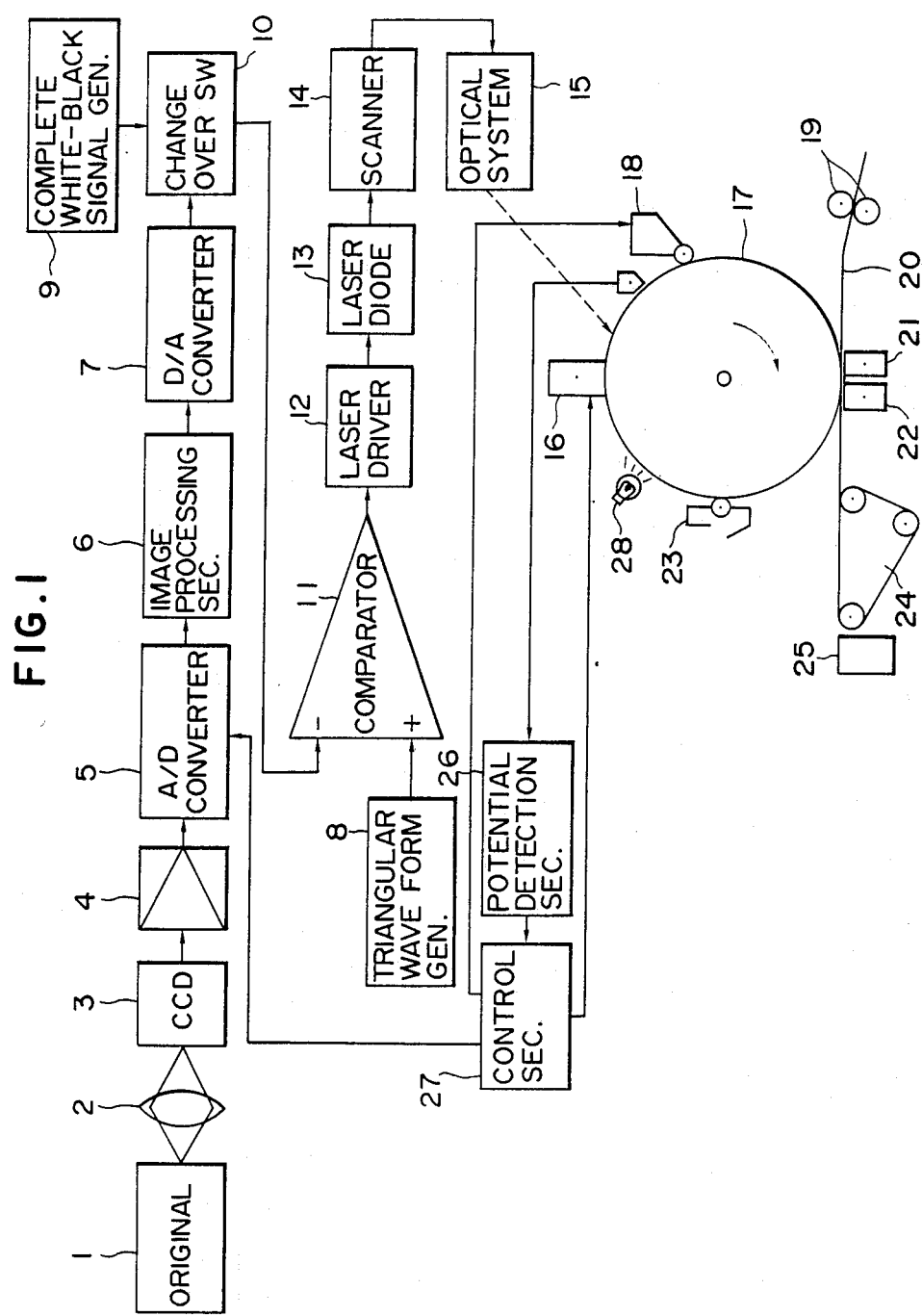
FIG. 1 is a block diagram of an image processing apparatus constituting an embodiment of the present invention.

These functions are additionally achieved in an image processing apparatus of which block diagram is shown in FIG. 1.

In FIG. 1, components of equivalent function as those in FIG. 4 are represented by same numbers. There are additionally shown a complete white-black signal generator 9 for generating signals of complete white or black level; a selector switch 10 for selecting the image density signal from the D/A converter 7 or a signal from said complete white-black signal generator 9; a potential detector 26 for detecting the potential on the photosensitive drum 17; and a control unit 27 for correcting the functions of various circuits in response to a signal from the potential detector 26 In such structure, in the regulation of the surface potential or in the potential control, the density level signal from the D/A converter 7 is replaced, by means of said selector switch 10, by the output signal from the complete white-black signal generator 9, which is supplied to the input terminal of the comparator 11.

Figure 3:
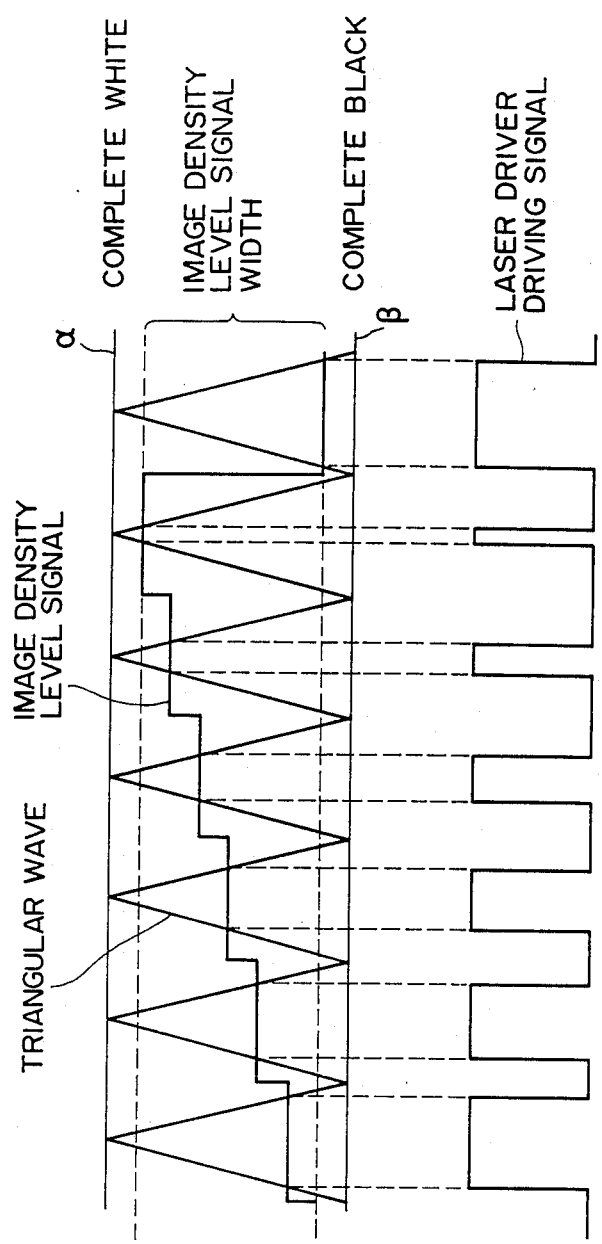
FIG. 3 is a chart showing pulse-width modulation in said embodiments.

Said complete white-black signal generator 9 is adapted to generate a complete white level signal of the level $\alpha$ shown in FIG. 3, or a complete black level signal of the level $\beta$.

The selector switch 10 may be actuated manually or automatically, and is preferably shifted from the output of the D/A converter 7 to the output signal of the complete white-black signal generator 9 for example during the pre-rotation of the photosensitive drum 17, or between two successive latent image formation on the photosensitive drum 17. Also the complete white signal or the complete black signal may be independently generated manually or automatically.

The potentials formed on the photosensitive drum 17 corresponding to thus selected complete white (light) level $V_L$ and complete black (dark) level $V_D$ are detected by the potential detector 26, and said levels are transmitted to the control unit 27 which corrects $V_D$ and $V_L$ by varying the charging potential of the primary charger 16 or the converting range of the A/D converter 5. Also the control unit 27 may be adapted to regulate the developing bias of the developing unit 18, based on the complete white level $V_L$ detected by the potential detector 26.

As explained in the foregoing, the present embodiment enables the image forming apparatus designed for intermediate tone reproduction, to generate reference signals corresponding to complete white and complete black, thereby achieving practically useful performance and also facilitating the correction in the manufacture.

Figure 2:
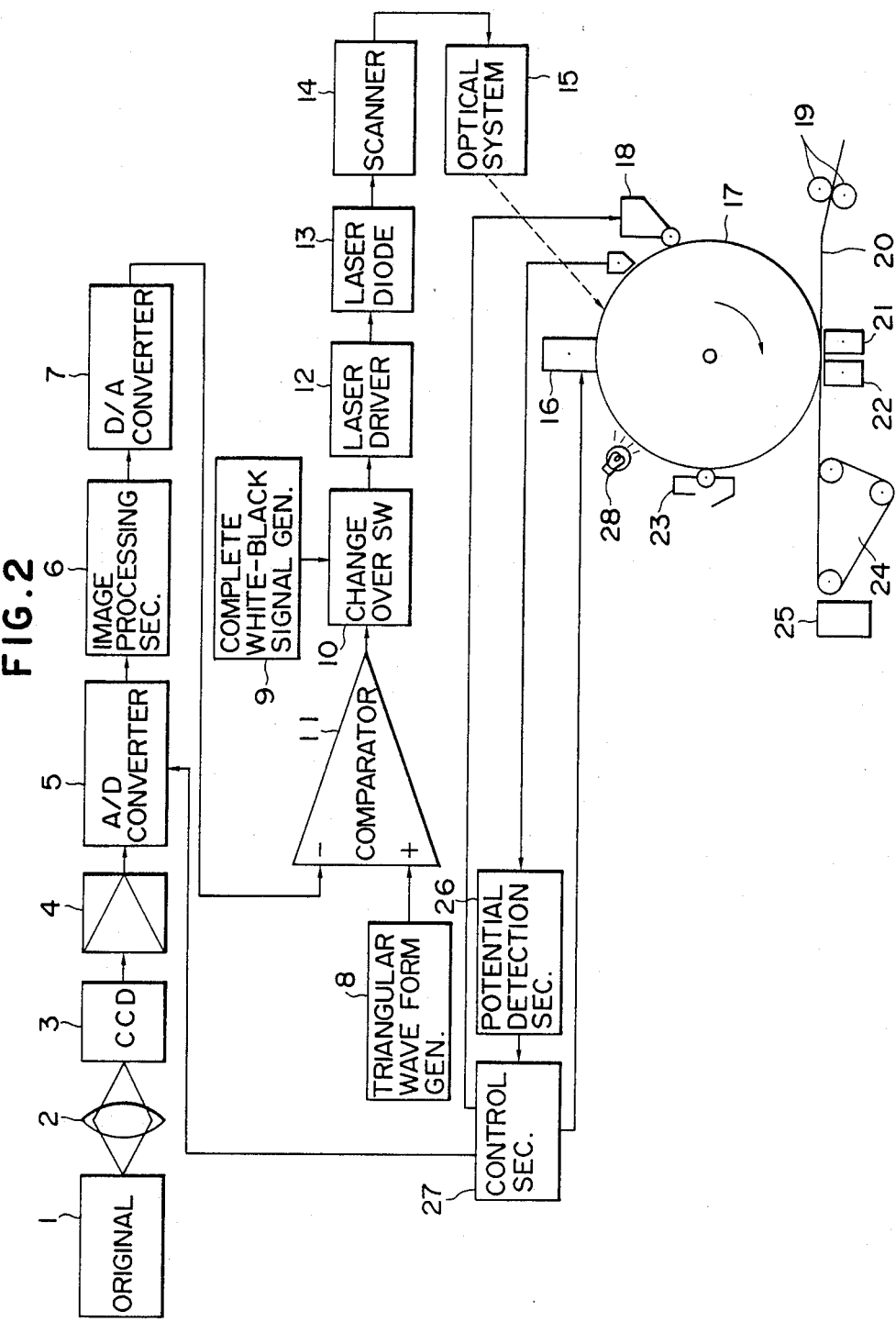
FIG. 2 is a block diagram of an image processing apparatus constituting another embodiment.

Also the generation of the signals of complete white and black levels for replacing the density level signal of the input image signal is not limited to the circuit structure shown in FIG. 1, and a similar effect can be obtained for example with a circuit as shown in FIG. 2. In the block diagram shown in FIG. 2, the selector switch 10 selects, instead of the output of the comparator 11, the complete white/black signal generator 9 for generating a zero pulse duration or a pulse duration exceeding a cycle of the triangular wave.

In the following there will be explained another embodiment of the present invention. In the foregoing embodiments the laser is driven with a zero pulse duration and a pulse duration exceeding a cycle of the triangular wave, and surface potentials $V_L$, $V_D$ corresponding to complete white and complete black are measured. In the following embodiment the laser is driven with pulse durations corresponding to two different density signals located between complete black and complete white, and the control is conducted in such a manner that the surface potentials V1, V2 thus obtained approach to predetermined target values.

Figure 7B:
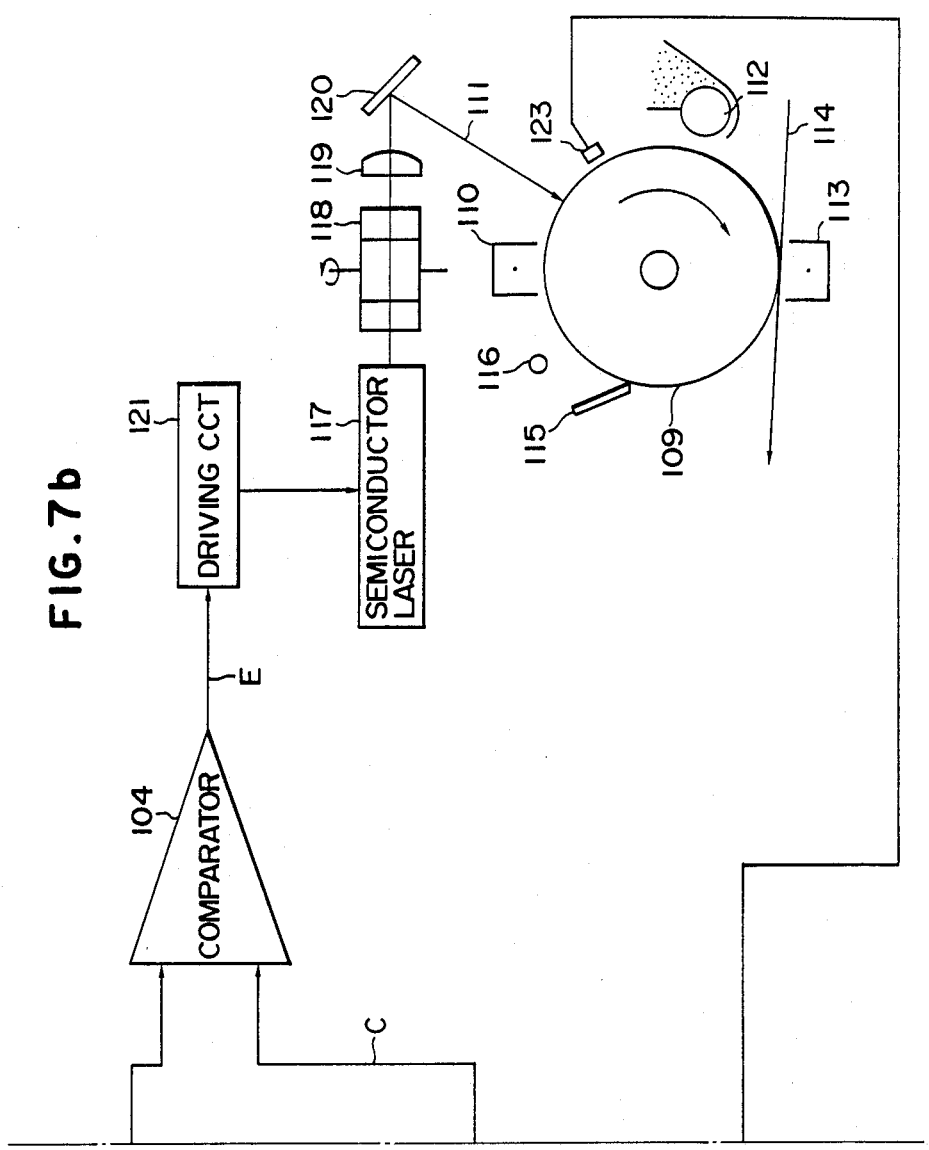
FIG. 7 composed of FIGS. 7a and 7b is a block diagram of an image processing apparatus constituting another embodiment of the present invention.

FIG. 7 shows the details of such embodiment. A digital video signal is latched in a latch 101 with a video clock signal VK and is thus synchronized. Said video clock signal VK is obtained by vidiging, into half, the frequency of a master clock signal MK by means of a J-K flip-flop 105. Said video signal is converted into an analog video signal by a D/A converter 102, of which output is converted into a voltage by a resistor 103 and is then supplied to an input terminal of a comparator 104. On the other hand, the master clock signal MK is subjected to predetermined frequency division in a frequency divider 106 according to a frequency switch signal, and is further subjected to frequency division into half in a J-K flip-flop 107 to obtain a clock signal with a duty ratio of 50%. The ratio of the period of said clock signal to that of the video clock signal VK is same as the dividing ratio of the frequency divider 106. Said clock signal is converted, in a triangular wave generator 108, into a triangular wave, which is supplied to the other input terminal of the aforementioned comparator 104 and is compared with the analog video signal, thereby obtaining a pulse width modulated signal. Said pulse width modulated signal E is supplied to a driving circuit 121 which, in response, turns on and off a semiconductor laser 117 thus generating a laser beam 111. Said beam 111 performs a scanning motion by a scanner 118 composed for example of a rotary polygon mirror or galvano mirror. There are also provided a lens 119 for focusing the laser beam 111 as a spot on a photosensitive member 109, and a mirror 120 for deflecting the optical path.

An electrophotographic photosensitive drum 109 rotated as indicated by an arrow is at first uniformly charged with a charger 110 and is exposed to a laser beam 111 which is on-off modulated according to the modulating signal and performs a scanning motion in a direction substantially perpendicular to the rotating direction of said photosensitive drum 109, whereby an electrostatic latent image formed thereon is developed into a visible image in a developing unit 112.

The visible toner image formed on the photosensitive drum 109 is transferred, by means of a transfer charger 113, onto a recording sheet 114 and is fixed thereon by an unrepresented fixing unit while the toner remaining on the photosensitive drum 109 after image transfer is eliminated by a cleaning unit 115. The charge remaining on said drum 109 thereafter is eliminated by the light from a lamp 116, and the above-explained steps are thereafter repeated.

Figure 8:
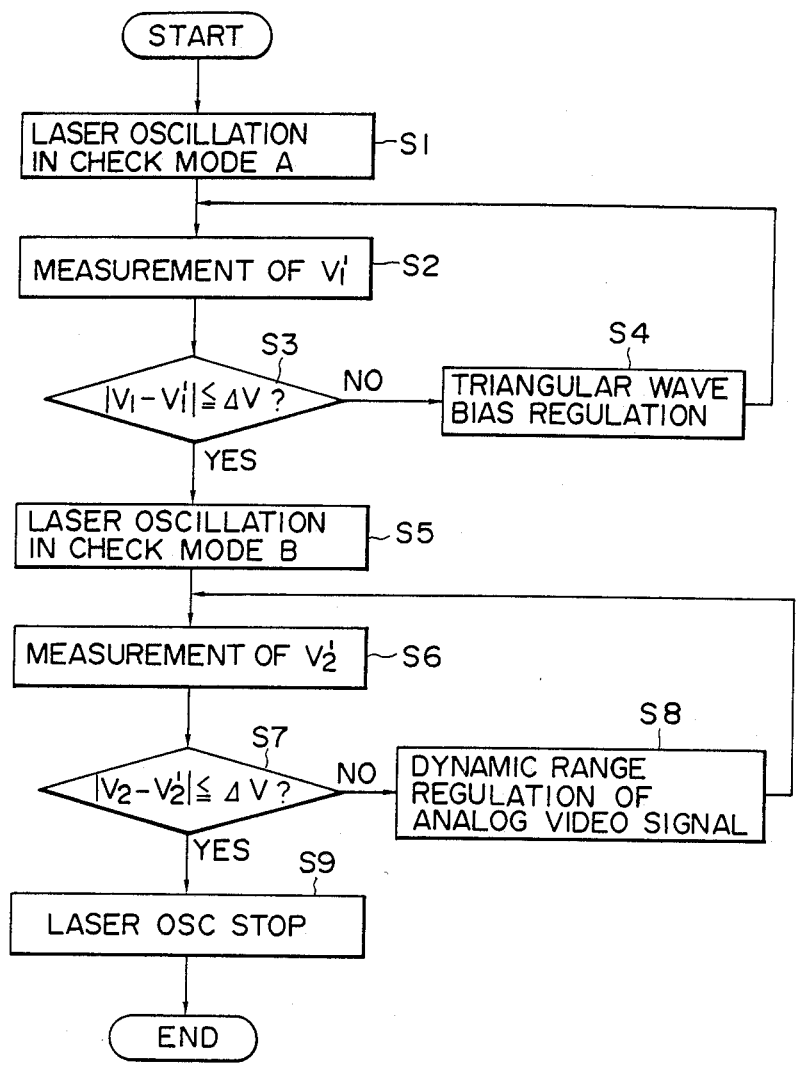
FIG. 8 is a flow chart showing the control sequence executed by a CPU shown in FIG. 7.

There are further shown a CPU 122 for controlling various circuits; a ROM 126 storing a program of the flow chart shown in FIG. 8; a RAM 127 used as a work area for the CPU 122; and a selector 130 which transmits either the digital video signal or a check mode signal of a signal line 131 from the CPU 122, in response to an instruction therefrom and according to selecting information sent on said signal line 131.

In the present embodiment there is employed a developing unit 112 for so-called reversal development in which the toner is deposited in the light areas exposed to the laser beam, so that the toner supplied from the developing unit 112 to the photosensitive drum 109 is charged in a polarity same as that of the charge obtained by the charger 110. Stated differently, the laser beam 111 is so modulated as to irradiate areas of the photosensitive drum 109 where the toner is to be deposited.

In an image forming mode, the image is obtained by subjecting the digital video signal to a pulse width modulation through the steps explained above, and supplying thus obtained pulse-width modulated signal E to the driving circuit 121 for driving the semiconductor laser 117.

In the present embodiment, a control mode operation is conducted prior to the operation in the above-explained image forming mode.

In the control mode, the photosensitive drum 109 is rotated, and the charger 110 and the scanner 118 are also activated. In this mode the developing unit 112 and the transfer charger 113 may or may not be activated, but the charge-eliminating lamp 116 is preferably activated.

In the control mode of the present embodiment, the output image is regulated by the bias adjustment of the triangular wave generator (hereinafter called check mode A) and by the adjustment of dynamic range of the analog video signal (hereinafter called check mode B). These processes will be explained in the following, with reference to a flow chart shown in FIG. 8. Said control mode is initiated by the transmission of a control signal to the CPU 122.

At first the check mode A is executed. In a step S1, a digital video signal of the check mode A as shown in FIG. 9(a) is generated. Also a triangular wave synchronized with the digital video signal is generated and is compared in the comparator 104, and the semiconductor laser 117 is driven with a pulsewidth modulated signal shown in FIG. 9(b). The photosensitive drum 109 is scanned with thus emitted laser beam 111. In a step S2, the surface potential V1' of thus exposed photosensitive drum 109 is detected with the potential sensor 123.

Then, in steps S3 and S4, the CPU 122 regulates the bias regulating means 124 of the triangular wave generator in response to thus detected surface potential V1' of the photosensitive drum 109, until the difference between the surface potential V1' of the photosensitive member and the desired surface potential V1 becomes smaller than a predetermined value.

The digital video signal of the check mode A has a level arbitrarily selected in such a manner that the turn-off period of the semiconductor laser 117 is longer than the turn-on period thereof.

The desired surface potential V1 can be easily selected in advance, in consideration of the characteristic of the photosensitive member 109 and the level of the digital video signal of the check mode A. Thus the bias of the triangular wave C is regulated by the bias regulating means 124 until the difference between the desired surface potential V1 and the actual surface potential V1' on the photosensitive member 109 becomes smaller than the predetermined value.

The check mode A is thus completed, and the check mode B is then executed, starting from a step S5.

In the step S5, a digital video signal for the check mode B as shown in FIG. 9(c) is generated to drive the semiconductor laser 117 in the same manner as in the check mode A, and, in a step S6, the potential sensor 123 detects the surface potential V2' of the photosensitive member 109 in the same manner as in the check mode A.

Then, in steps S7 and S8, the CPU 122 regulates the dynamic range of the analog video signal with the dynamic range regulating means 125, in response to thus detected surface potential V2' of the photosensitive member 109, until the difference between the surface potential V2' and a desired surface potential V2 becomes smaller than a predetermined value.

The digital video signal of the check mode B has a level arbitrarily selected in such a manner that the turn-on period of the semiconductor laser 117 is longer than the turn-off period thereof.

The desired surface potential V2 can be $ easily selected in advance, in consideration of the characteristic of the photosensitive member 109 and the level of the digital video signal of the check mode B.

When the above-explained steps are completed, a step S9 deactivates the semiconductor laser 117, thus terminating the check mode processes.

As explained in the foregoing, the control is conducted in such a manner that the difference between the potential of the photosensitive member 109 and the desired potential becomes smaller than a predetermined value $\Delta V$, and said value $\Delta V$ will be explained in the following.

Figure 10:
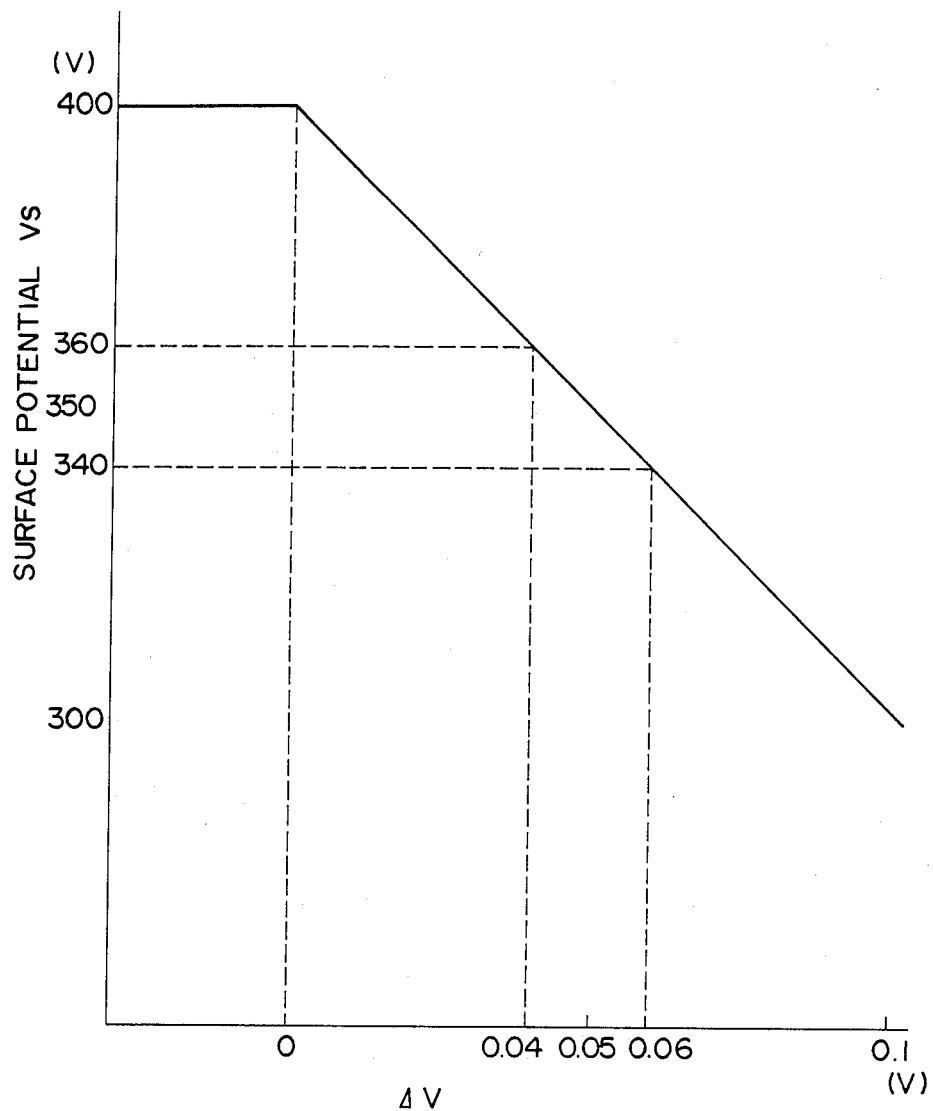
FIG. 10 is a chart showing the surface potential of a photosensitive member.

FIG. 10 shows the change in surface potential Vs of a positively chargeable photosensitive member as a function of potential difference $\Delta V = V_P - V_C$ wherein $V_P$ is the peak value of the triangular wave of a dynamic range of 1 V and $V_C$ is the potential in the check mode A. In the present embodiment, as will be apparent from FIG. 10, the surface potential $V_S$ of the photosensitive member 109 is 400 V when the semiconductor laser 117 is completely turned off but becomes lower as $\Delta V$ increases, and it has been confirmed that a very stable image can be obtained if the circuits are regulated at a potential of 350±10 V. The corresponding value of $\Delta V$ is 0.05±0.01 V. Such control with the surface potential of the photosensitive member 109 allows to rectify the influence, on the image, of fluctuation or variation in the laser power, response of laser, E-V characteristic of the photosensitive member etc. Also said control with the potential provides a wider latitude of regulation for obtaining a good image, and this is one of the reasons of obtaining a stable image.

In the present embodiment the analog video signal and the triangular wave are regulated by two parameters which are the bias of the triangular wave and the dynamic range of the analog video signal, but there may be employed any method capable of regulating the relationship between the analog video signal and the triangular wave, for example the regulation of the amplitude and bias of the triangular wave vis-a-vis fixed analog video signal.

When the control mode is terminated or temporarily suspended, the aforementioned image forming mode is initiated in response to an image forming (print) instruction.

The above-explained control mode may be executed in response to an operation of turning on the main (power) switch of the apparatus, or in response to the actuation of a print switch for instructing the image forming mode, or during a period between successive sheet transfers (or during a period after the laser beam exposure for an image and before the laser beam exposure for a succeeding image).

It is also possible to form a test area adjacent (in the scanning direction of the laser beam) to the image area on the photosensitive member, and to effect the aforementioned control by forming a sample image in said test area. In such case, said test area is scanned by a laser beam modulated with the signal C after or before the scanning of a line on the photosensitive member with the laser beam modulated by a signal corresponding to the information to be recorded. Consequently the control mode and image forming mode are executed in parallel manner in this case.

Also the operation of the control mode need not necessarily be conducted automatically. For example it is possible to display the potentials of the photosensitive member in the check modes A and B by depressing a control mode switch, and to regulate the relation between the analog video signal and the triangular wave with a variable resistor.

In the following there will be explained another embodiment of the present invention. In the embodiment shown in FIG. 7, the surface potentials V1', V2' are measured, and the bias of the triangular wave and the dynamic range of the analog video signal are regulated according to the measured values.

However, if the photosensitive member shows significant changes in $V_D$, $V_L$ after the lapse of time or due to a change in temperature, the surface potentials V1, V2 determined in advance may eventually provide a relation:

$$V_D < V1 \text{ or } V_L > V2$$

For example in case of $V_D < V1$, the target potential V1 cannot be reached by the adjustment of the relation between the analog video signal and the triangular wave, as a potential exceeding $V_D$ cannot be realized in this case.

The adjustment is not possible also in case of $V_L > V2$. Naturally these are extreme cases, but the image quality is significantly affected by the changes in $V_D$ and $V_L$.

$V_D$ is the potential of the photosensitive member when the laser is completely turned off, and $V_L$ is the potential when the laser is completely turned on.

The above-mentioned drawback is prevented in the present embodiment, by measuring the surface potentials $V_D$, $V_L$, $V1'$ and $V2'$ and regulating the bias of the triangular wave and the dynamic range of the analog video signal in such a manner that ($V_D - V1'$ and $V_L - V2'$) are respectively contained in predetermined ranged.

Now this embodiment will be explained in relation to a block diagram shown in FIG. 11, wherein same components as those in FIG. 7 are represented by same numbers. There are also shown an OFF signal generating circuit 140 for generating an OFF signal which turns off the semiconductor laser 117 in place of the pulse-width modulated signal derived from the input image signal; an ON signal generating circuit 141 for generating an ON signal for completely turning on the semiconductor laser 117; and a relay 128 for selecting the pulse-width modulated signal or one of the signals from said circuits 140, 141.

Figure 11B:
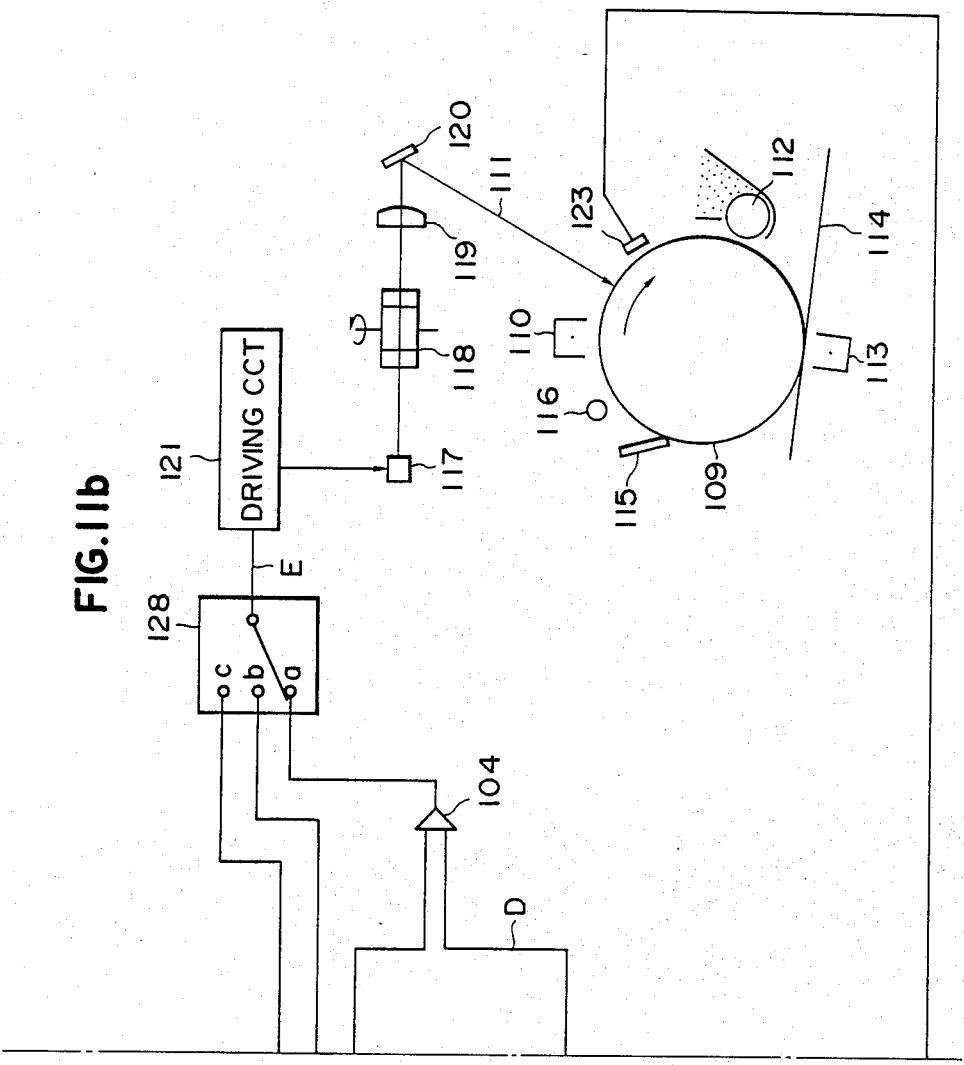
FIG. 11 composed of FIGS. 11a and 11b is a block diagram of an image processing apparatus constituting still another embodiment of the present invention.

In the embodiment shown in FIG. 11, there is executed the control mode prior to the execution of the image forming mode. In said control mode, the photosensitive member 109 is rotated, and the charger 110 and the scanner 118 are also activated. The developing unit 112 and the transfer charger 113 may or may not be activated, but the charge-eliminating lamp 116 is preferable activated.

Figure 12B:
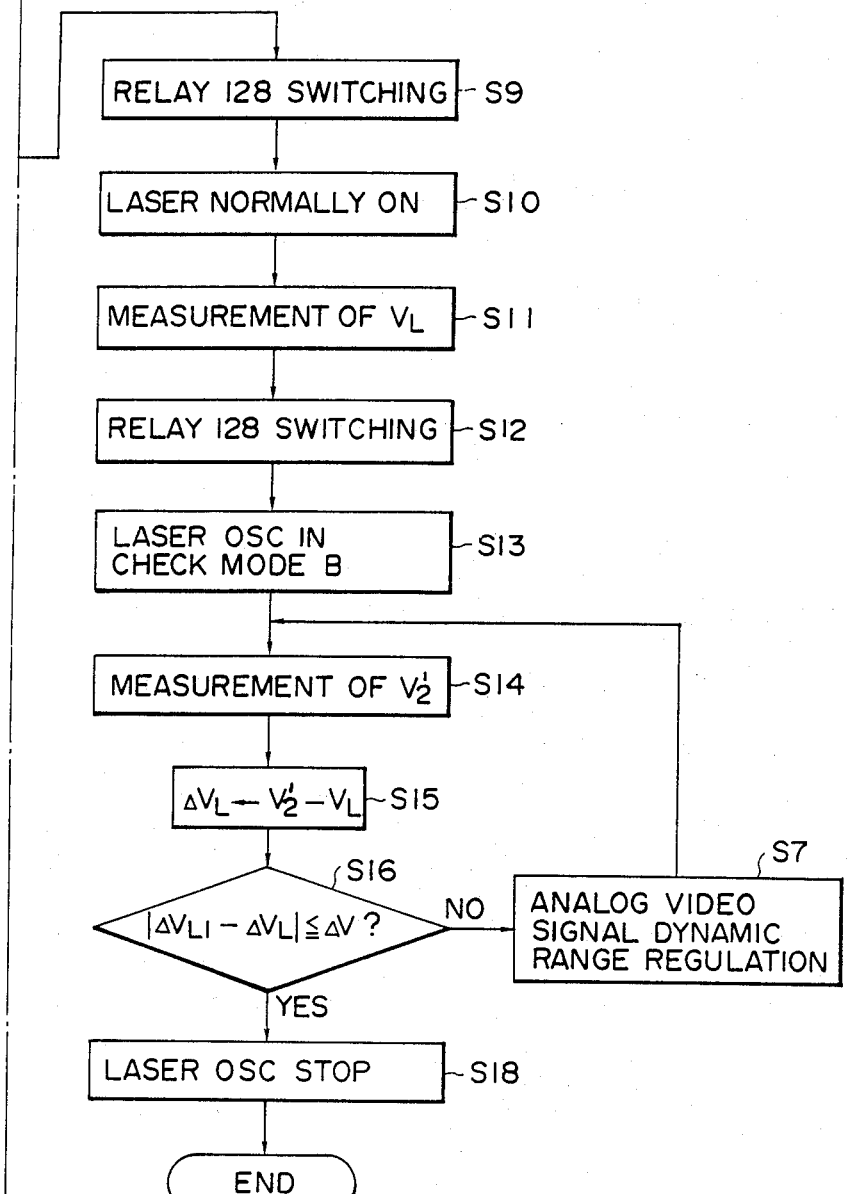
FIG. 12 composed of FIGS. 12a and 12b is a flow chart showing the control sequence executed by a CPU shown in FIG. 11.

Now reference is made to a flow chart shown in FIG. 12, for explaining the operation of said control mode. A program corresponding to said flow chart is stored in the ROM 126.

Steps S1 to S8 execute the adjustment of the bias of a triangular wave generated by the triangular wave generator (check mode A), and steps starting from S9 execute the adjustment of the dynamic range of the analog video signal released from the D/A converter 102.

A step S1 connects the switch of the relay 128 to a terminal b connected to the OFF signal generator 140 to introduce the signal thereof to the driving circuit of the semiconductor laser 117, whereby said laser 117 is constantly turned off. A step S2 detects the surface potential $V_D$ of the photosensitive member 109 in this state, by the potential sensor 123.

Then a step S3 connects the relay 128 to the terminal a, and a step S4 provides the selector 130 with data corresponding to a selecting signal and a check mode A signal through the signal line 131, in order to generate the signal for the check mode A as shown in FIG. 9(a), whereby a pulse-modulated signal as shown in FIG. 9(b) is generated and drives the semiconductor laser 117. A step S5 detects the surface potential $V1'$ of the photosensitive member with the potential sensor 123, and, in a step S6, the CPU 122 calculates the difference $\Delta V_D$ of the surface potentials $V_D$ and $V1'$ thus detected according to an equation:

$\Delta V_D = V_D - V1'$.

Then a step S7 discriminates whether the difference between said $\Delta V_D$ and a predetermined potential difference $\Delta V_{D1}$ is equal to or less than a predetermined value $\Delta V$, and, if not, a step S8 controls the bias regulating means 124. Then the procedure starting the step S5 is repeated to regulate the bias of the triangular wave generator 108 until the difference between $\Delta V_D$ and $\Delta V_{D1}$ becomes equal to or smaller than $\Delta V$. When the process of the check mode A is thus completed, the process of the check mode B is executed starting from a step S9 for regulating the dynamic range of the analog video signal.

At first a step S9 shifts the relay 128 to the terminal C. Thus, in a step S10, the signal from the ON signal generator 141 is supplied to the driving circuit 121, thereby constantly turning on the semiconductor laser 117. A step S11 then detects the surface potential $V_L$ of the photosensitive member 109 with the potential sensor 123. Subsequently a step S12 shifts the relay 128 to the terminal a, and a step S13 generates a signal for the check mode B as shown in FIG. 9(c) whereby the semiconductor laser 117 is driven with a pulse-width modulated signal as shown in FIG. 9(d). Then a step S14 detects the surface potential $V2'$ of the photosensitive member in this state by the potential sensor 123. A step S15 then calculates the difference $\Delta V_L$ of thus detected surface potentials $V_L$, $V2'$ according to an equation $\Delta V_L = V2' - V_L$. Then a step S16 discriminates whether the difference between $\Delta V_L$ and a desired potential difference $\Delta V_{L1}$ is equal to or less than a predetermined value $\Delta V$, and, if not, the dynamic range of the analog video signal is regulated by the dynamic range regulating means 125. The regulation is conducted by repeating the procedure starting from the step S14. After the completion of the regulation of the bias and the dynamic range, a step S18 turns off the semiconductor laser 117, thus terminating the operation of the control mode.

The desired surface potential differences $\Delta V_{D1}$ and $\Delta v_{L1}$ can be easily determined in advance, in consideration of the characteristic of the photosensitive member 109 and the level of the digital video signal in the check modes A and B.

In the present embodiment the relationship between the analog video signal and the triangular wave is regulated with two parameters, which are the bias of the triangular wave and the dynamic range of the analog video signal, but there may also be employed other methods for regulating said relationship, for example by regulating the amplitude and bias of the triangular wave while maintaining the analog video signal constant.

After the above-explained control mode is terminated or temporarily suspended, the aforementioned image forming mode is initiated in response to an image forming (printing) instruction.

The above-explained control mode may be executed in response to the turning-on of a main power switch of the apparatus, or in response to the actuation of a print switch for instructing an image forming operation, or during a period between successive sheet transfers (namely during a period after the laser beam exposure for an image and before the laser beam exposure for a succeeding image). It is also possible to form a test area adjacent (in the scanning direction of the laser beam) to the image area on the photosensitive member, and to effect the aforementioned control by forming a sample image in said test area. In such case, said test area is scanned by a laser beam modulated with the signal C after or before the scanning of a line on the photosensitive member with the laser beam modulated by a signal corresponding to the information to be recorded. Consequently the control mode and image forming mode are executed in parallel manner in this case.

Also the operation of the control mode need not necessarily be conducted automatically. For example it is possible to display the potentials of the photosensitive member in the check modes A and B by depressing a control mode switch, and to regulate the relation between the analog video signal and the triangular wave with a variable resistor.

As explained in the foregoing, the present embodiment allows to obtain a stable image with high image quality through the regulation of the relationship between the video signal and the pattern signals in such a manner that the difference $\Delta V_D$ between $V_D$ and $V1'$ and the difference $\Delta V_L$ between $V_L$ and $V2'$ do not respectively exceed desired values $\Delta V_{D1}$ and $\Delta V_{L1}$. Also the process of the present embodiment can correct the fluctuating factors in the process of converting the image signal into the surface potential of the photosensitive member, such as the fluctuation or variation in the laser power, wavelength of laser beam, E-V characteristic of the photosensitive member etc. The process of the present embodiment can be more effectively utilized if it is combined with the already known control of $V_D$ and $V_L$.

In the following there will be explained still another embodiment of the present invention. In the embodiment shown in FIG. 11, the bias of the triangular wave and the dynamic range of the analog video signal are controlled in such a manner that $(V_D - V1')$ and $(V_L - V2')$ are respectively contained in predetermined ranges. On the other hand, in the following embodiment, the laser current and the charging current are so controlled as to bring the surface potentials Vd, V(, respectively corresponding to the complete turning-on and complete turning-off of the laser, to target values. Then, after said control, surface potentials $V_{OO}$ and $V_{FF}$, obtained by driving the laser with a minimum pulse width and a maximum pulse width, are measured, and the pulse width is controlled according to the measured values.

Figure 13:
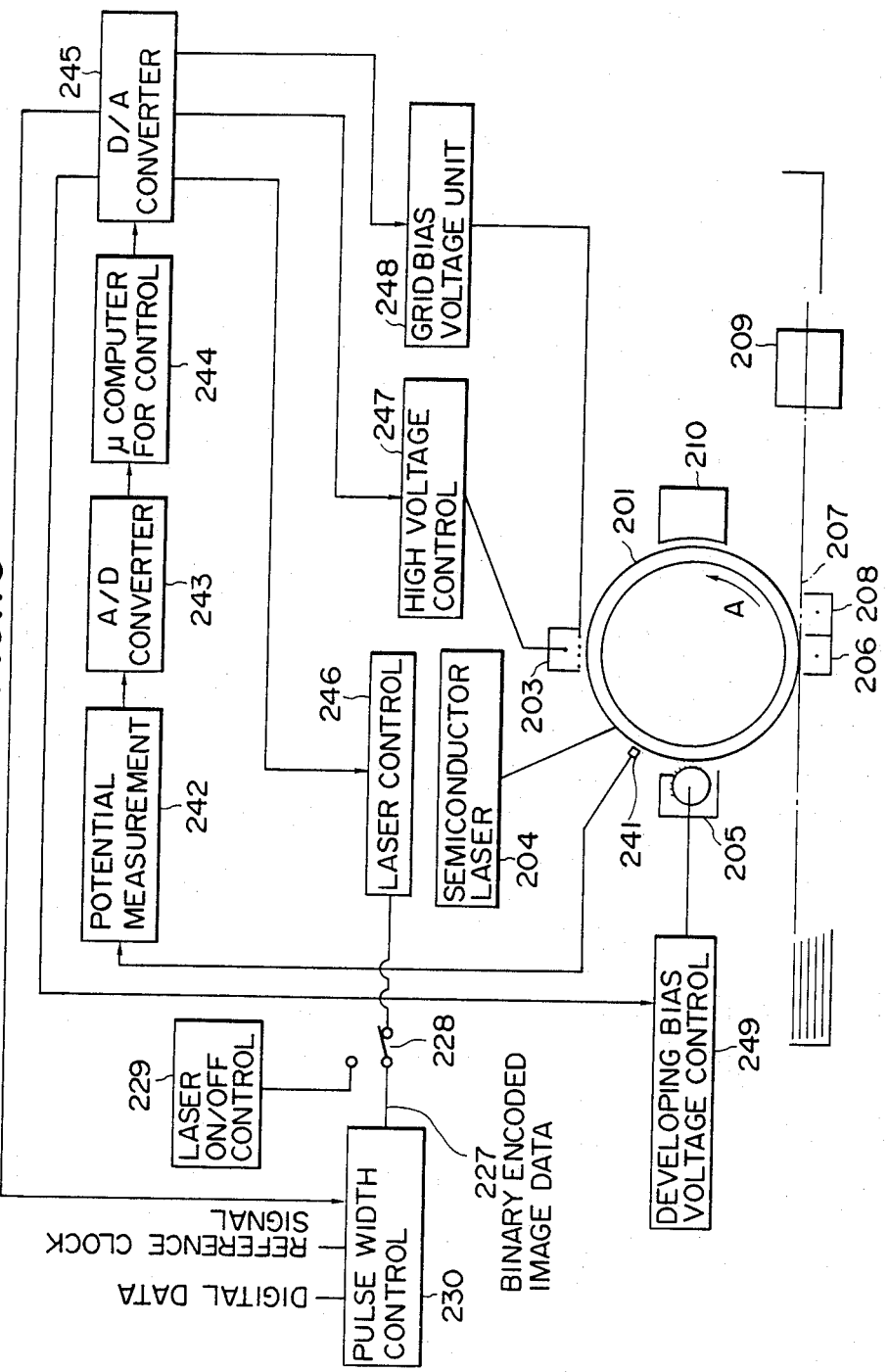
FIG. 13 is a block diagram of an image processing apparatus constituting still another embodiment of the present invention.

FIG. 13 is a block diagram of said embodiment.

Figure 14:
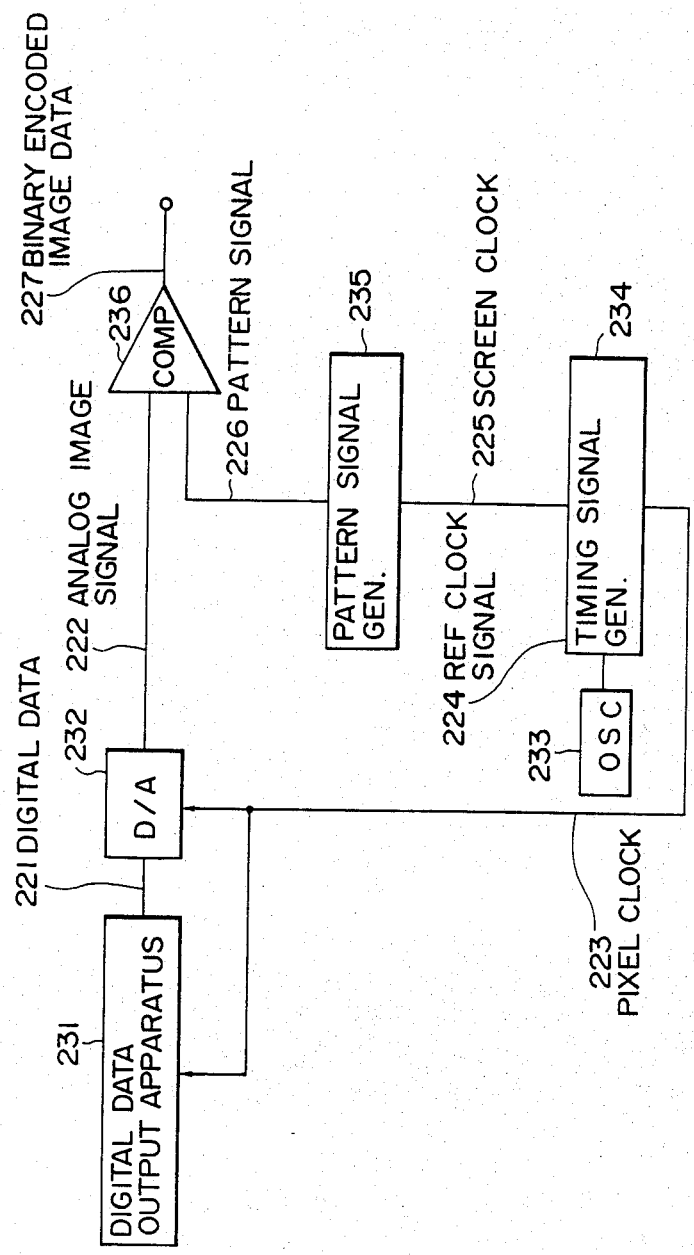
FIG. 14 is a block diagram showing details of a part of the circuit shown in FIG. 13.

Pulse width control means 230 has a structure as shown in FIG. 14, and is designed to receive digital data 21 and a reference clock signal 24 and to generate binary encoded image data 27 which are almost continuously modulated in pulse width according to the image density. The image formation is conducted in a similar manner as in the foregoing embodiments. The image data are converted into a modulated scanning beam, which forms an electrostatic latent image on a photosensitive drum 201 rotated in a direction A and uniformly charged by a charger 203. Said latent image is developed by a developing unit 205 into a visible image, which is transferred, by means of a transfer charger 206, onto a recording sheet 207. The remaining toner is collected by a cleaner 210. The recording sheet is separated from the photosensitive drum by a separating charger 208 and is discharged through a fixing unit 209.

In the following there will be explained the details of the pulse width control means 230, with reference to FIG. 14.

Digital data 221 from a digital data output apparatus 231 are converted into an analog image signal 222 by a D/A converter 232. Separately a pixel clock signal 223 for image data transfer is subjected, in a timing signal generator 234, to a frequency division (to a half frequency in this case) by means of a reference clock signal 224 generated by an oscillator 233 to obtain a screen clock signal 225. Said screen clock signal is used as the synchronization signal in a pattern signal generator 235 to generate a pattern signal 226, for example a triangular wave. A comparator 236 compares the analog image signal 222 with the pattern signal 226, and generates binary encoded image data 227 assuming a value "0" or "1" respectively when said analog image signal 222 is larger or smaller.

In this manner the digital image signal is converted into an analog image signal and is then compared with a triangular wave of a predetermined frequency. Thus it is rendered possible to achieve substantially continuous pulse width modulation and to obtain a high-quality image signal with satisfactory tonal rendition.

A potential sensor 241 is provided with a probe positioned close to the surface of the photosensitive drum after the laser beam exposure, and detects the potential of the latent image by means of a potential measuring circuit 242. The detected analog potential is converted by an A/D converter 243 into a digital signal and supplied to a potential controlling microcomputer 244, of which output is again converted into an analog value by a D/A converter 245 and is utilized for controlling the intensity of a semiconductor laser 204, charging current of a charger 203, grid bias voltage, developing bias voltage etc. through a laser control unit 246, a high-voltage control unit 247, a grid bias voltage unit 248, a developing bias voltage control unit 249 etc.

Figure 15:
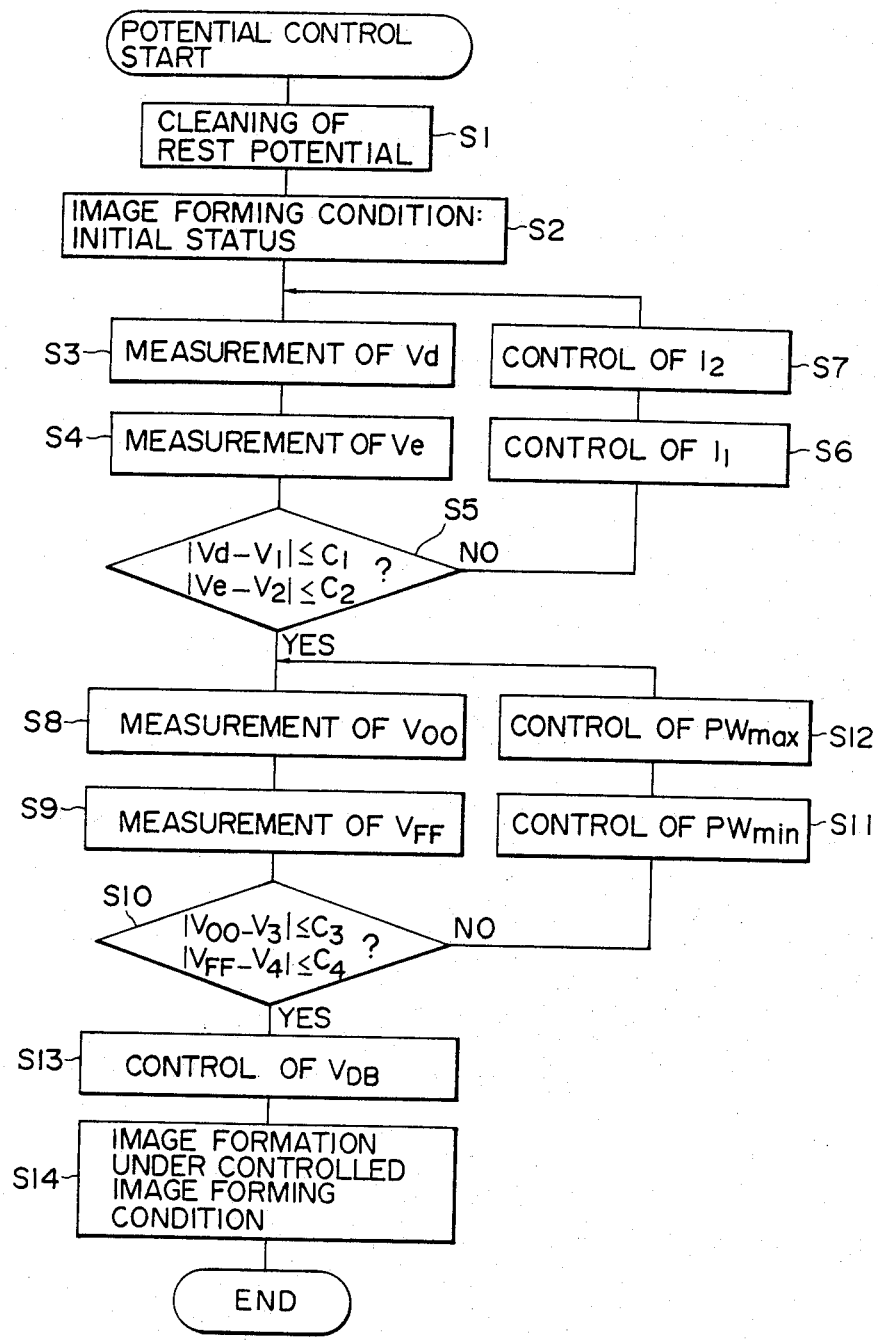
FIG. 15 is a flow chart showing the control sequence executed by a CPU shown in FIG. 13.

This control sequence is executed prior to the exposure of an image to be recorded, and FIG. 15 shows an example of such control sequence.

When the potential control sequence is started, a step S1 effects a pre-rotation of the photosensitive drum 201 in order to remove the retentive potential with a cleaner 210. Then a step S2 sets the initial values of the charging current and laser beam intensity, and steps S3 and S4 select laser on-off control means 229 through the switch 228 shown in FIG. 13, thus measuring the surface potentials $V_d$, $V_e$ when the laser is turned on and off at the initial charging current and at the initial laser beam intensity. Then A step S5 discriminates whether the differences between the values Vd, Ve measured in the steps S3, S4 and the target values V1, V2 are within tolerances C1, C2.

If said discrimination turns out negative, a step S6 controls the charging current $I_1$ according to an equation:

$$\Delta I_1 = \alpha_1 \Delta V_d + \alpha_2 \Delta V_e$$

and a step S7 controls the driving current of the semiconductor laser 204 according to an equation:

$$\Delta I_2 = \beta_1 \Delta V_d + \beta_2 \Delta V_e$$

Then the sequence returns to the step S3 to repeat the above-explained steps.

On the other hand, if the discrimination in the step S5 turns out affirmative, the operations of the control loop is completed. Subsequently the aforementioned pulse-width control means 230 is selected by the switch 228, and steps S8 to S12 control the average potentials $V_{OO}$, $V_{FF}$ of the areas respectively exposed with a minimum pulse width and with a maximum pulse width in such a manner that these potentials are respectively within tolerances C3, C4 around the target values V3, V4.

Then, in case of reversal development, a step S13 determines the developing bias voltages $V_{DB}$ by:

$$V_{BD1} = V_d - V_{Back1}$$

$V_{BD2}=V_e-V_{Back2}$ wherein $V_{Back1}$ and $V_{Back2}$ are voltages required for preventing the background smudge, and a step S14 executes the image formation under thus determined image forming conditions.

The coefficients $\alpha_1$, $\alpha_2$, $\beta_1$ and $\beta_2$ in the foregoing equations indicate the slope of the function.

The effectiveness of the present embodiment will be shown in the following.

Figure 16:
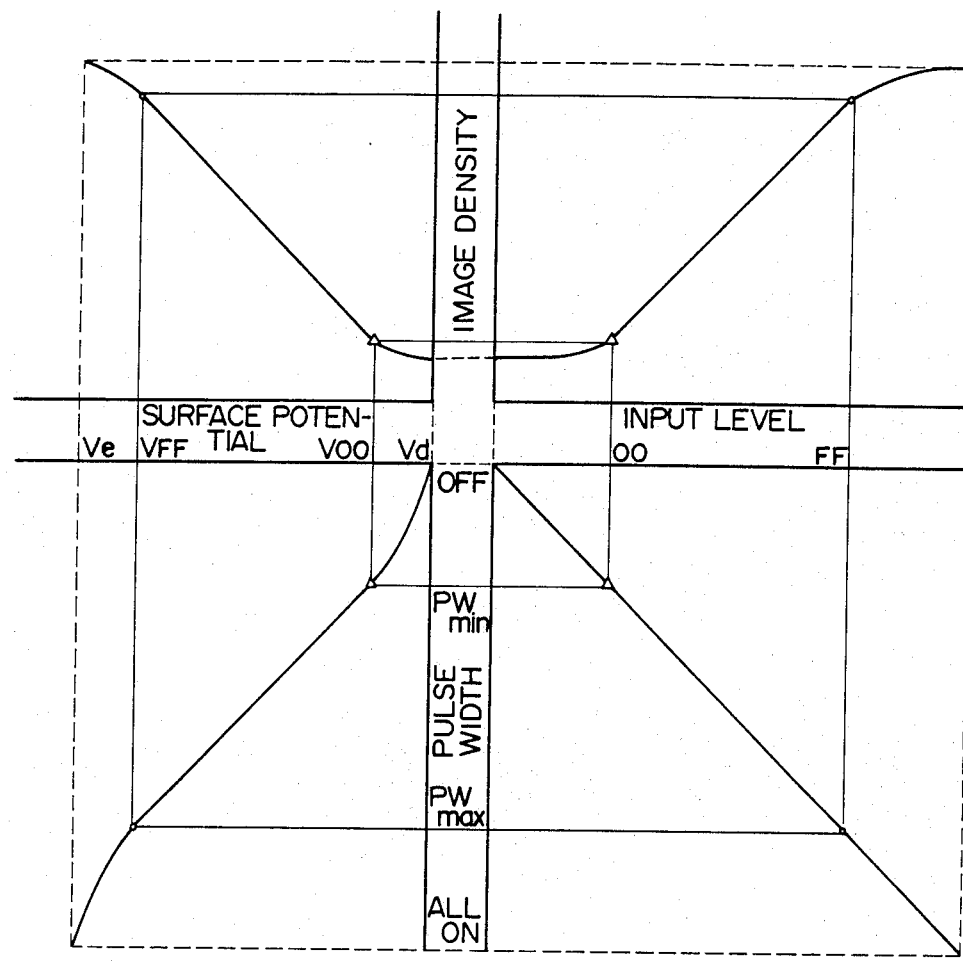
FIG. 16 is a chart showing the relationship between the input level and the output density.

FIG. 16 shows the sensitometry in case 8-bit input data (of 256 levels from "00" to "FF") are subjected to substantially continuous pulse-width modulation as explained above, and the obtained signals are subjected, in the above-explained laser beam printer, to conversion from the laser beam to the surface potential and further to the image density.

If emphasis is given to the tonal rendition in the process explained above, a linear relation between the input level and the image density is desirable. However, as will be apparent from FIG. 16, the linearity is observed only between a mark "Δ" and a mark "o". Thus a satisfactory tonal rendition can be obtained by selecting the input level "00" at the mark "Δ", and "FF" at the mark "o". When this linear range is correlated with the pulse width modulation and with the surface potential, the input level "00" corresponds to a minimum pulse width $PW_{min}$ and Vee while the input level "FF" corresponds to a maximum pulse width $PW_{max}$ and $V_{FF}$, and these potentials are usually different from the dark potential Vd when the laser is completely turned off and from the light potential Ve when the laser is completely turned on. However the range utilized for image formation is from the mark "Δ" to "o", and the process of the present embodiment in which the values $V_{oo}$ and $V_{FF}$ are brought to the target values $V_3$, $V_4$ is effective in providing an image of high image quality in stable manner in the image forming apparatus utilizing such image processing.

Figure 17:
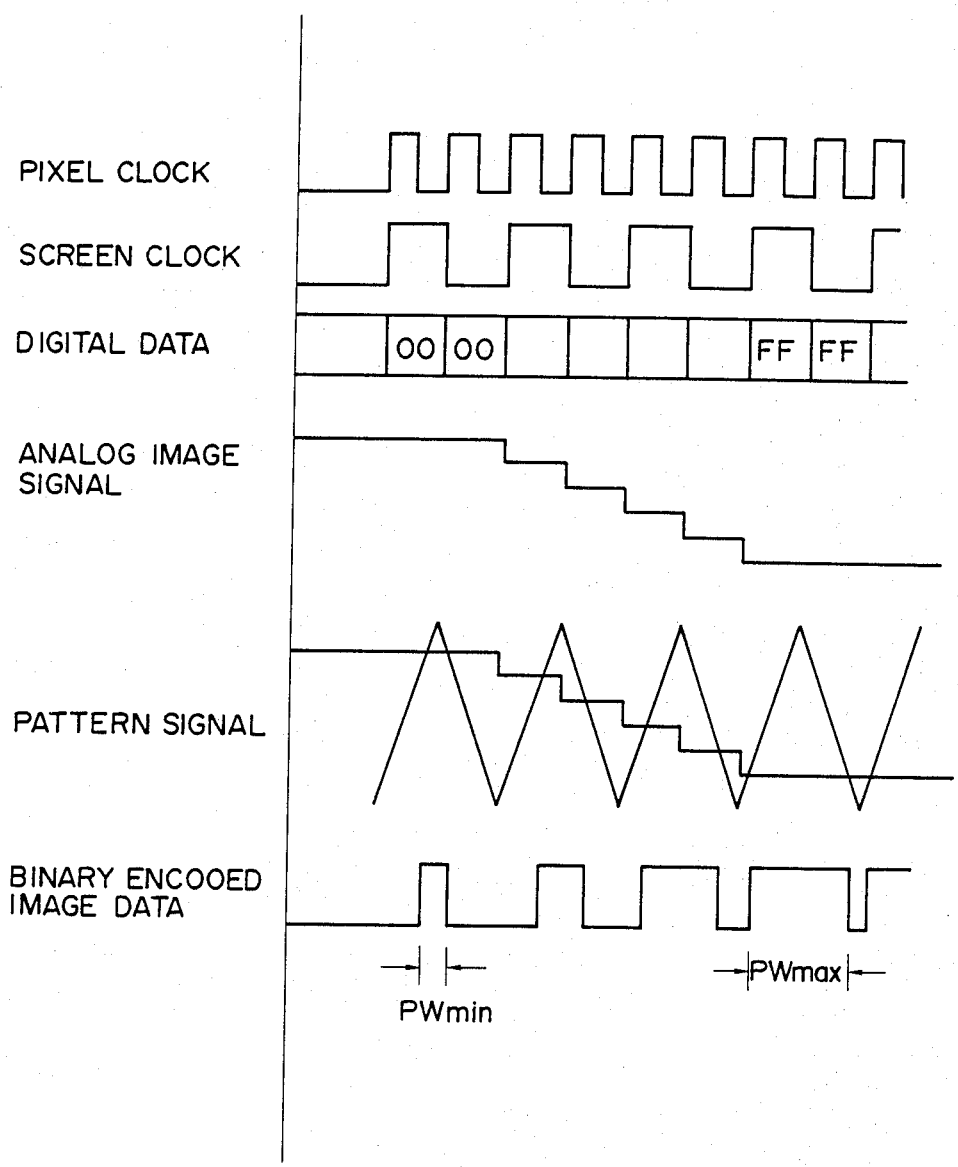
FIG. 17 is a timing chart showing various signals in said embodiment.
Figure 18:
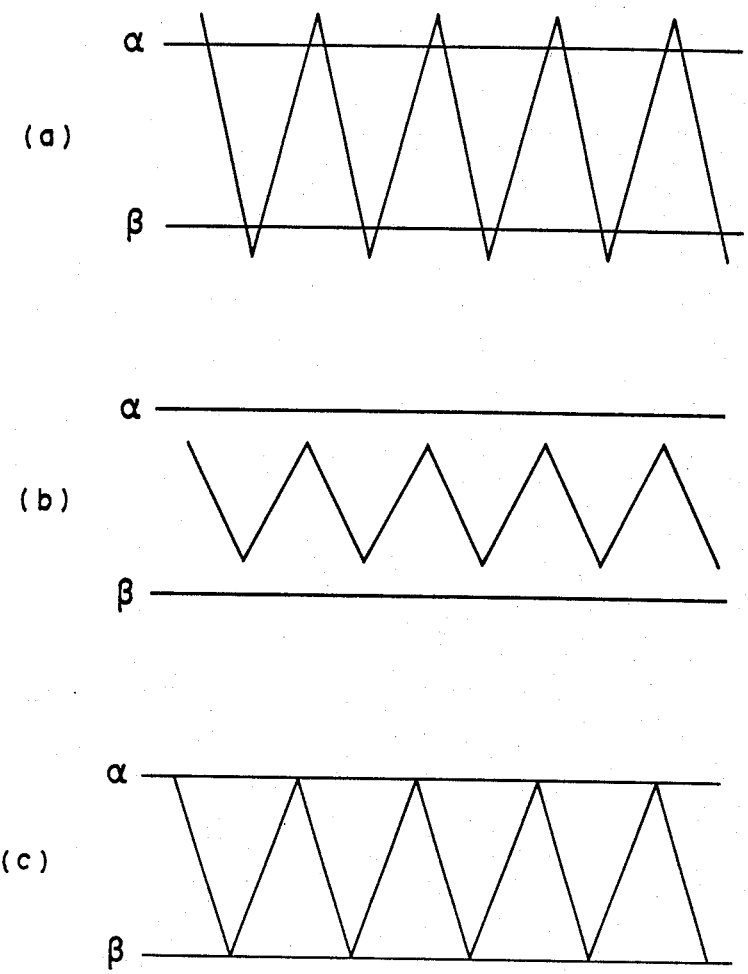
FIG. 18 is a chart showing the relationship between analog video signal and triangular wave.

FIG. 17 shows the binary encoded image data 227 obtained by the conversion of digital data 221 (containing states "00", halftone levels, and "FF") into the analog image signal 222, and by the comparison thereof with a triangular pattern signal 226 of a half period. A change in the amplitude of the pattern signal 226 allows to modify the relation between the input level and the pulse width. It is thus possible to control $PW_{min}$ and $PW_{max}$ as shown in the steps S11, S12 in FIG. 15, and to select a linear range from the mark "Δ" to "o" in FIG. 16.

On the other hand, if the image is composed for example of characters, emphasis is not given to the tonal rendition but to a high density and absence of background smudge. In such case the image formation should preferably depend, not on the maximum and minimum levels of the pulse width control means 230, but on the complete turn-on and turn-off states of the laser. Such states are indicated by broken lines in FIG. 16. The present embodiment can provide stable image output also in such case, since the surface potentials Vd, Ve when the laser is completely turned on or off are also controlled to the target values.

In addition to such mode switching, the present embodiment can realize, even during the image formation with a limited input range from "00" to "FF", a complete turn-off state of the laser for a white image area in order to reduce the background smudge, or such complete turn-off state during the pre-rotation step, postrotation step or during a period between image formations in a continuous imaging operation, and can prevent damage to the photosensitive member due to an unpredicted surface potential.

Besides the simultaneous measurements and controls of $V_d$, $V_e$, $V_{OO}$ and $V_{FF}$ allow to simplify the control algorithm, in comparison with the case in which the control for $V_d$ and $V_e$ or the control for $V_{OO}$ and $V_{FF}$ is selected according to the operating mode.

Furthermore it is rendered possible to identify the cause of a malfunction, or to know the state of the status of the printer. For example, in the measurement and control of $V_d$ and $V_e$, an abnormal retention of the charged potential $V_e$ or an absence of sensor output will indicate a malfunction in the charging system, laser or sensor system, while, in the measurement and control of $V_{OO}$ and $V_{FF}$, an abnormally distant levels of $V_d$ and $V_{OO}$ or an absence of pulse width modulation will indicate a defective level adjustment of the pattern signal and the analog signal, or a malfunction of the pulse width control circuit.

Though the foregoing four embodiments have been explained by a laser beam printer employing image scanning process, the present invention is applicable also to a laser beam printer employing background scanning process, or to printers employing other exposure methods, such as utilizing LED or LCD.

Also, in the foregoing description the tone reproduction is achieved by pulse width modulation, but, even in tone reproduction with the dither method or density pattern method, the maximum and minimum input levels may not correspond to the zero and full exposure levels in order to achieve faithful tone reproduction, and the potential control process of the present invention is effective in such case for obtaining high-quality images in stable manner.

Furthermore, in the foregoing description the surface potentials are adopted as the parameters to be measured, but it is also possible to control the image forming conditions by measuring the image density.

What we claim is:

1. An image processing apparatus comprising:
   first signal generating means for generating an analog signal indicative of a density level;
   second signal generating means for generating a predetermined signal of a fixed period;
   driving signal generating means for generating a pulse-width modulated drive signal in accordance with the analog signal from said first signal generating means and the predetermined signal from said second signal generating means;
   image process means adapted to function according to the drive signal from said driving signal generating means;
   third signal generating means for generating a predetermined pattern signal, wherein said third signal generating means is adapted to generate, as said pattern signal, a signal larger than the maximum value of said density level signal and a signal smaller than the minimum value of said density level signal;
   selector means for providing said image process means with either the drive signal from said driving signal generating means or the pattern signal from said third signal generating means; and
   correcting means for correcting the density of the image provided by said image process means.

2. An image processing apparatus according to claim 1, wherein said image process means comprises charger means for charging a recording member, exposure means for exposing said charged recording member for forming an electrostatic latent image thereon, and developing means for developing said electrostatic latent image, wherein said exposure means is activated according to said drive signal or said pattern signal.

3. An image processing apparatus according to claim 2, wherein said pattern signal contains a signal for completely turning on said exposure means and a signal for completely turning off said exposure means.

4. An image processing apparatus according to claim 2 or 3, wherein said exposure means comprises laser beam generating means.

5. An image processing apparatus according to claim 2, wherein said correction means comprises detector means for detecting the surface potential of said recording member, and regulation means for regulating the relation between said pattern signal and said density level signal.

6. An image processing apparatus comprising:
first signal generating means for generating an analog signal indicative of density level;
second signal generating means for generating a predetermined signal of a fixed period;
driving signal generating means for generating a pulse-width modulated drive signal in accordance with the analog signal from said first signal generating means the predetermined signal from said second signal generating means;
image process means adapted to function according to the drive signal from said driving signal generating means, wherein said image process means comprises charge means for charging a recording member, exposure means for exposing said charged recording member for forming an electrostatic latent image thereon, and developing means for developing said electrostatic latent image, wherein said exposure means is activated according to said drive signal or said pattern signal;
third signal generating means for generating a predetermined pattern signal;
selector means for providing said image process means with either the drive signal from said driving signal generating means or the pattern signal from said third signal generating means; and
correction means for correcting the density of the image provided by said image process means,
wherein said correction means comprises detector means for detecting the surface potential of said recording member, and regulation means for regulating the relation between said pattern signal and said density level signal, and wherein said regulation means is adapted to regulate the bias of said pattern signal and/or the dynamic range of said density level signal.

7. An image processing apparatus according to claim 1, or 6, wherein said predetermined signal is a triangular wave signal.

8. An image processing apparatus comprising:
first signal generating means for generating an analog signal indicative of density level;
second signal generating means for generating a predetermined signal of a fixed period;
driving signal generating means for generating a pulse-width modulated drive signal in accordance with the analog signal from said first signal generating means and the predetermined signal from said second signal generating means;
image process means adapted to function according to the drive signal from said driving signal generating means, wherein said image-process means comprises charger means for charging a recording member, exposure means for exposing said charged recording member for forming an electrostatic latent image thereon, and developing means for developing said electrostatic latent image, wherein said exposure means is activated according to said drive signal or said pattern signal;
third signal generating means for generating a predetermined pattern signal;
selector means for providing said image process means with either the drive signal from said driving signal generating means or the pattern signal from said third signal generating means; and
correcting means for correcting the density of the image provided by said image process means;
wherein said regulation means comprises detection means for detecting the surface potential of said recording member, and regulation means for regulating the conditions of said charging means and those of said developing means.

9. An image processing apparatus according to claim 6 or 8, wherein said regulation means is adapted to automatically effect regulating operations according to the potential detected by said detection means.

10. An image processing apparatus according to claim 6 or 8, wherein said regulation means is adapted to effect said regulating operations in manual manner.

11. An image processing apparatus comprising:
first signal generating means for generating an analog signal indicative of a density level;
second signal generating means for generating a predetermined signal of a fixed period;
driving signal generating means for generating a pulse-width modulated drive signal in accordance with the analog signal from said first signal generating means and the predetermined signal from said second signal generating means;
image process means adapted to function according to the drive signal from said driving signal generating means, wherein said image process means comprises charger means for charging a recording member, exposure means for exposing said charged recording member for forming an electrostatic latent image thereon, and developing means for developing said electrostatic latent image, wherein said exposure means is activated by said drive signal;
detection means for detecting a level corresponding to the image density to be provided by said image process image in accordance with a predetermined pattern signal of a predetermined pulse width; and
regulation means for regulating the image density to be provided by said image process means in accordance with the detection level of said detection means,
wherein said regulation means is adapted to regulate the bias of said predetermined signal and/or the dynamic range of said density level signal.

12. An image processing apparatus according to claim 11, wherein said predetermined pattern signal is such that the turn-off period of said exposure means is longer than the turn-off period thereof.

13. An image processing apparatus according to claim 11, wherein said predetermined pattern signal is such that the turn-on period of said exposure means is longer than the turn-off period thereof.

14. An image processing apparatus according to claim 11, wherein said detection means is adapted to detect the surface potential of said recording member.

15. An image processing apparatus according to claim 11, wherein said regulation means is adapted to regulate the relation between said predetermined signal and said density level signal.

16. An image processing apparatus according to claim 15, wherein said predetermined pattern signal is such that the turn-off period of said exposure means is longer than the turn-off period thereof, and said regulation means is adapted to regulate the bias of said predetermined signal in accordance with the output of said detection means.

17. An image processing apparatus according to claim 15, wherein said predetermined pattern signal is such that the turn-on period of said exposure means is longer than the turn-off period thereof, and said regulation means is adapted to regulate the dynamic range of said density level signal in accordance with the output of said selection means.

18. An image processing apparatus according to claim 11 or 14, wherein said predetermined signal is a triangular wave signal.

19. An image processing apparatus comprising:
first signal generating means for generating an analog signal indicative of a density level;
second signal generating means for generating a predetermined signal of a fixed period;
driving signal generating means for generating a pulse-width modulated drive signal in accordance with the analog signal from said first signal generating means and the predetermined signal from said second signal generating means;
image process means adapted to function according to the drive signal from said driving signal generating means, wherein said image process means comprises charger means for charging a recording member, exposure means for exposing said charged recording member for forming an electrostatic latent image thereon, and developing means for developing said electrostatic latent image, and said exposure means is activated according to said drive signal;
detection means for detecting a surface potential of said recording means corresponding to the image density to be provided by said image process means in accordance with first and second pattern signals; and
regulation means for regulating the image density to be provided by said image process means in accordance with the difference between first and second detection potentials corresponding to said first and second pattern signals,
wherein said regulation means is adapted to regulate the bias of said predetermined signal and/or the dynamic range of said density lever signal.

20. An image processing apparatus according to claim 19, wherein said first and second pattern signals are a signal for turning off said exposure means and a signal for which the turn-off period of said exposure means is longer than the turn-on period thereof.

21. An image processing apparatus according to claim 19, wherein said first and second pattern signals are a signal for completely turning on said exposure means and a signal for which the turn-on period of said exposure means is longer than the turn-off period thereof.

22. An image processing apparatus according to claim 19, wherein said regulation means is adapted to regulate the relation between said predetermined signal and said density level signal.

23. An image processing apparatus according to claim 22, wherein said first and second pattern signals are a signal for turning off said exposure means and a signal for which the turn-off period of said exposure means is longer than the turn-on period thereof, and said regulation means is adapted to regulate the bias of said predetermined signal in accordance with the output of said detection means.

24. An image processing apparatus according to claim 22, wherein said first and second pattern signals are a signal for completely turning on said exposure means and a signal for which the turn-on period of said exposure means is longer than the turn-off period thereof, and said regulation means is adapted to regulate the dynamic range of said density level signal in response to the output of said detection means 25. An image processing apparatus according to claim 18, 19, wherein said predetermined signal is a triangular wave signal.

26. An image processing apparatus according to claim 19, 20 or 23, wherein said exposure means comprises laser beam generating means.

27. An image processing apparatus comprising:
first signal generating means for generating an analog signal indicative of a density level;
second signal generating means for generating a predetermined signal of a fixed period;
driving signal generating means for generating a pulse-width modulated drive signal in accordance with the analog signal from said first signal generating means and the predetermined signal from said second signal generating means;
image processing means adapted to function according to the drive signal from said driving signal generating means, wherein said image process means comprises charger means for charging a recording member, exposure means for exposing said charged recording member for forming an electrostatic latent image thereon, and developing means for developing said electrostatic latent image, and said exposure means is activated by said drive signal;
detection means for detecting a surface potential of said recording member corresponding to the image density to be provided by said image process means in accordance with a predetermined pattern signal; and
regulation means for regulating the image density to be provided by said image process means in response to a detected value corresponding to said predetermined pattern signal, after the control of image forming conditions,
wherein said regulation means is adapted to regulate the bias of said predetermined signal and/or the dynamic range of said density level signal.

28. An image processing apparatus according to claim 27, wherein said pattern signal is a signal for which the turn-off period of said exposure means is longer than the turn-on period thereof, and/or a signal for which the turn-on period is longer than the turn-off period.

29. An image processing apparatus according to claim 27, wherein said regulation means is adapted to regulate the relation between said predetermined signal and said density level signal in accordance with the output from said detection mans.

30. An image processing apparatus according to claim 27, wherein said image forming conditions are controlled by the charging conditions and/or exposure conditions.

31. An image processing apparatus according to claim 27, wherein said regulation means is adapted to control said charging conditions and/or exposure conditions in accordance with the output of said detection means when said exposure means is turned off and/or is completely turned on.

32. An image processing apparatus according to claim 26, 27, 29, wherein said predetermined signal is a triangular wave signal.

33. An image processing apparatus according to claim 27, 30, wherein said exposure means comprises laser beam generating means.

34. An image processing apparatus according to claim 27, wherein said predetermined signal is a triangular wave signal and wherein said exposure means comprises laser beam generating means.

35. An image processing apparatus according to claim 14, 19, 20, 23, wherein said predetermined signal is a triangular wave signal and wherein said exposure means comprises laser beam generating means 36. An image processing apparatus according to claim 14, 19, 20, 23, wherein
said exposure means comprises laser beam generating means,
said regulation means is adapted to effect said regulation operations in a manual manner,
said correction means comprises detector means for detecting the surface potential of said recording member, and regulation means for regulating the relation between said pattern signal and said density level, and
wherein said predetermined signal is a triangular wave signal.

37. An image processing apparatus according to claim 14, 19, 20 or 23, wherein
said exposure means comprises laser beam generating means,
said regulation means is adapted to effect said regulation operations in a manual manner, wherein said regulation means comprises detection means for detecting the surface potential of said recording member, and regulation means for regulating the conditions of said charging means and those of said developing means, and
said predetermined signal is a triangular wave signal.

38. An image processing apparatus comprising:

first signal generating means for generating an image signal;
second signal generating means for generating a first signal indicative of density level larger than a maximum value of density level of said image signal and a second signal indicative of density level smaller than a minimum value of density level of said image signal;
driving signal generating means for generating a pulse-width modulated drive signal in accordance with the image signal from said first signal generating means or the first and second signals from said second signal generating means;
image forming means for forming an image on a recording medium in accordance with the drive signal generated from said driving signal generating means;
selecting means for selecting as to providing said image forming means with either the drive signal according to the image signal from said first signal generating means or the drive signal according to the first and second signals from said second signal generating means; and
correcting means for correcting the density of the image formed by said image forming means in accordance with a pattern formed on said recording medium based on said first and second signals.

39. An image processing apparatus comprising:
first signal generating means for generating an image signal;
second signal generating means for generating a first pattern signal indicative of density level larger than a maximum value of density level of said image signal and a second pattern signal indicative of density level smaller than a minimum value of density level of said image signal;
driving signal generating means for generating a pulse-width modulated drive signal in accordance with the image signal from said first signal generating means;
image forming means for forming an image on a recording medium in accordance with the drive signal generated from said driving signal generating means;
selecting means for selecting as to providing said image forming means with either the drive signal generating means or the first and second pattern signals from said second signal generating means; and
correcting means for correcting the density of the image formed by said image forming means in accordance with a pattern formed on said recording medium based on said first and second pattern signals.

* * * * *

UNITED STATES PATENT AND TRADEMARK OFFICE
CERTIFICATE OF CORRECTION

PATENT NO. : 4,864,419

DATED : September 5, 1989

INVENTOR(S) : TETSUO SAITO ET AL.

It is certified that error appears in the above-identified patent and that said Letters Patent is hereby corrected as shown below:

AT [56] REFERENCES CITED

U.S. Patent Documents, insert
--4,800,422   1/1989   Riseman.....358/280--.

SHEET 19 OF 20

FIG. 17, "ENCOOED" should read --ENCODED--.

COLUMN 5

Line 45, "vidiging," should read --dividing,--.

COLUMN 7

Line 46, "$" should be deleted.
Line 67, "AV" should read --$\Delta V$--.

COLUMN 9

Line 34, "able" should read --ably--.

COLUMN 10

Line 35, " $v_{L1}$" should read -- $V_{L1}$--.

COLUMN 11

Line 32, "Vd, V(," should read --Vd, Vℓ,--

UNITED STATES PATENT AND TRADEMARK OFFICE
CERTIFICATE OF CORRECTION

PATENT NO. : 4,864,419
DATED : September 5, 1989
INVENTOR(S) : TETSUO SAITO ET AL.

Page 2 of 3

It is certified that error appears in the above-identified patent and that said Letters Patent is hereby corrected as shown below:

COLUMN 13

Line 7, "function." should read --functions.--.

COLUMN 15

Line 28, "means the" should read --means and the--.
Line 57, "1, or 6," should read --1 or 6,--.

COLUMN 16

Line 17, "correcting means" should read --correction means--.
Line 54, "process image" should read --process means--.
Line 66, "turn-off period" should read --turn-on period--.

COLUMN 17

Line 13, "turn-off period" should read --turn-on period--.
Line 23, "selection means." should read --detection means.--.
Line 48, "recording means" should read --recording member--.
Line 59, "density lever signal." should read --density level signal.--.

UNITED STATES PATENT AND TRADEMARK OFFICE
CERTIFICATE OF CORRECTION

PATENT NO. : 4,864,419

DATED : September 5, 1989

INVENTOR(S) : TETSUO SAITO ET AL.

Page 3 of 3

It is certified that error appears in the above-identified patent and that said Letters Patent is hereby corrected as shown below:

COLUMN 18

Line 24, "claim 18, 19," should read --claim 19,--.
    Line 27, "claim 19, 20 or 23," should read --claim 19 or 23--.

COLUMN 19

Line 5, "detection mans." should read --detection means.--.
    Line 17, "claim 26, 27, 29," should read --claim 27--.
    Line 20, "claim 27, 30," should read --claim 27,--.
    Line 27, "claim 14, 19, 20, 23," should read --claim 14, 19, 20 or 23--.

Signed and Sealed this

Twenty-fourth Day of December, 1991

Attest:

HARRY F. MANBECK, JR.

*Attesting Officer*  *Commissioner of Patents and Trademarks*